(12) United States Patent
Ying

(10) Patent No.: US 11,672,379 B2
(45) Date of Patent: Jun. 13, 2023

(54) GRILL OF TOP PROJECTING AND RADIATING TYPE

(71) Applicant: Wei Ying, Jinhua (CN)

(72) Inventor: Wei Ying, Jinhua (CN)

( * ) Notice: Subject to any disclaimer, the term of this patent is extended or adjusted under 35 U.S.C. 154(b) by 855 days.

(21) Appl. No.: 16/620,591

(22) PCT Filed: Jun. 12, 2018

(86) PCT No.: PCT/CN2018/090914
§ 371 (c)(1),
(2) Date: Dec. 9, 2019

(87) PCT Pub. No.: WO2018/228401
PCT Pub. Date: Dec. 20, 2018

(65) Prior Publication Data
US 2020/0121127 A1    Apr. 23, 2020

(30) Foreign Application Priority Data
Jun. 13, 2017   (CN) .......................... 201720684830.X

(51) Int. Cl.
*A47J 37/06* (2006.01)
(52) U.S. Cl.
CPC ................................ *A47J 37/0676* (2013.01)

(58) Field of Classification Search
CPC . A47J 37/0676; A47J 37/0709; A47J 37/0736
USPC .................................... 99/324, 355, 338, 331
See application file for complete search history.

(56) References Cited

U.S. PATENT DOCUMENTS 5,000,083 A * 3/1991 Pickave .............. A47J 37/0623
99/332

* cited by examiner

*Primary Examiner* — Tu B Hoang
*Assistant Examiner* — Thomas J Ward
(74) *Attorney, Agent, or Firm* — Bayramoglu Law Offices LLC

(57) ABSTRACT

A grill of top projecting and radiating type includes a projection heater, a support connection beam, a base and a grilling pan arranged on the base, wherein the base includes a substrate housing; an upper face of the substrate housing is provided with an oil collection upper housing; a grilling pan rotating motor is arranged in the substrate housing; the center of an upper surface of the grilling pan is low and the periphery thereof is high; a rotary socket pipe is fixedly arranged at the bottom center of the grilling pan; an electric motor shaft of the grilling pan rotating motor passes through the oil collection upper housing from bottom to top, is inserted into the rotary socket pipe and is then connected to the grilling pan to realize the synchronized rotation of the motor shaft and the grilling pan.

14 Claims, 15 Drawing Sheets

GRILL OF TOP PROJECTING AND RADIATING TYPE

TECHNICAL FIELD OF THE INVENTION

The present invention relates to the technical field of small household appliances for daily use, and in particular to a grilling pan of top projecting and radiating type.

BACKGROUND OF THE INVENTION

Modern grilling pans are of bottom heating type. In this style, the grilling pan is directly heated from the bottom, and the grilling pan and the heating body do not directly contact the bottom and top, respectively. Disadvantageously, this design cannot handle excess oil, and the size of fire cannot be directly observed. If the size of fire can be observed, the objects being grilled will be leaked onto the heating body. Hence, grilling pans of the side heating type and top heating type appear. However, the grilling pans of both the top projecting type and the downwardly projecting type face a big problem that is an inevitable problem during the grilling process, i.e., grilling smokes. There are the following methods for controlling the smokes in the prior art: controlling temperature, which however means that the cooking time is prolonged; and minimizing the retention of grilling oil, which would make the food taste dry. Therefore, it is necessary to develop additional methods that can solve the smoke problem during grilling and can also preserve the taste. It can also increase the range of grilling temperatures and speed up the grilling processes.

SUMMARY OF THE INVENTION

Technical Problem

An object of the present invention is to provide a grilling pan of a top (upper) projecting and radiating type, which mainly improves the overall grilling projection structure, enhances the structural heat dissipation, and the smoke exhaust structure. In addition, it improves how the heating pipe (heating element) of the grilling pan of top projecting type needs to be fixed on a top cover, so that the grilling pan becomes simple, convenient and robust.

Solutions to Problems

The present invention is implemented using the following technical solutions. A grill of top/upper projecting and radiating type includes a projection heater, a support connection beam, a base, and a grilling pan arranged on the base, the projection heater being located above the grilling pan, the projection heater being fixed on the base via the support connection beam, wherein the base includes a substrate housing; an upper end face of the substrate housing is provided with an oil collection upper housing; a grilling pan rotating motor is arranged in the substrate housing; the center of an upper surface of the grilling pan is low and the periphery thereof is high; a rotary socket pipe is fixedly arranged at the bottom center of the grilling pan; an electric motor shaft of the grilling pan rotating motor passes through the oil collection upper housing from bottom to top, is inserted into the rotary socket pipe and is then connected to the grilling pan so as to realize the synchronized rotation of the motor shaft and the grilling pan; a plurality of holes, through which oil drops, are arranged at intervals, around the rotary socket pipe, on the grilling pan; an upper end face of the oil collection upper housing is recessed downwards to form an oil collection guide cavity; the bottom of the oil collection guide cavity is provided with an oil drainage hole; the holes, through which oil drops, are located directly above the oil collection guide cavity; a front oil box is also arranged in the substrate housing; and, the front oil box is in communication with the oil drainage hole.

The grilling pan rotating motor drives the grilling pan to rotate, and the projection heater heats food on the grilling pan in an infrared radiation manner. Oil in the grilling process flows down along the grilling pan, then drops into the oil collection guide cavity through the holes through which oil drops, and finally flows into the front oil box for collection through the oil drainage hole in the oil collection guide cavity.

Preferably, a protruded oil-proof insertion seat is arranged on the bottom of the oil collection guide cavity; a lower end of the rotary insertion seat is suited on the oil-proof insertion seat; and, an electric motor shaft of the grilling pan rotating motor passes through the oil-proof insertion seat and is then inserted into the rotary insertion seat. The oil-proof insertion seat is higher than other positions of the oil collection guide cavity, so oil is prevented from leaking into the gap between the electric motor shaft and the oil collection upper housing.

Preferably, a plurality of ribs are radially arranged on an upper surface of the grilling pan. The arrangement of the ribs helps to reserve a certain gap between the food and the grilling pan, so that it is convenient for excess oil to flow down smoothly.

Preferably, a bump is provided at the center of the upper surface of the grilling pan, an oil connection groove ring is arranged around the bump, and the holes, through which oil drops, are formed on the oil collection groove circle. The bump is exactly located on the top of the rotary insertion seat.

The projection heater includes a projector housing, a connecting screen outer cover, a heating coil, a heat shield set and a smoke exhaust fan; the projector housing is of a dome structure having a concave or arc-shaped section; the heat shield set includes a housing connecting base, an outer heat shield and an inner fan cover which are successively arranged in a dome cavity inside the projector housing from top to bottom; the top of the projector housing is a vent cover; a plurality of vent holes are formed on the vent cover; an upper end of the housing connecting base is fixedly connected to the vent cover via a first fastener, while a lower end face thereof is fixedly connected to the outer heat shield via a second fastener, and the lower end face and the outer heat shield are fixedly connected together by a top connecting nut set of the inner fan cover; the housing connecting base is provided with a fan seat mounting through hole; the outer heat shield is provided with a fan opening A; an upper end face of the inner fan cover is recessed downwards to form a groove; the fan seat mounting through hole and the fan opening A are communicated up and down opposite to each other and form a mounting cavity with the groove; a fan seat is arranged in the mounting cavity, and the smoke exhaust fan is arranged on the fan seat; a plurality of wind holes distributed in a vortex shape are formed on the bottom of the groove; the connecting screen outer cover is arranged below the inner fan cover and is fixedly connected to the inner fan cover via a top connecting nut set; and, the heating coil is located between the connecting screen outer cover and the inner fan cover.

The projection heater further includes a vent cover seat that is matched with the top of the projector housing in shape; the vent cover seat covers the top of the projector housing; a fan top hole is formed at the top center of the vent cover seat; the vent cover is located in the fan top hole; a plurality of clamp pins are arranged at intervals on a lower edge of the vent cover seat; jacks are provided on the projector housing; and the clamp pins are inserted into the jacks in one-to-one correspondence.

Preferably, the connecting screen outer cover includes a cover body, a connecting disk and support concave frames; the cover body is hollow and the connecting disk is fixed at the center of the cover body; the plurality of support concave frames are fixedly arranged on a side face of the cover body facing the heating coil; frame grooves are provided on the support concave frames; the heating coil is clamped in the frame grooves on at least two support concave frames; and, the connecting disk is fixedly connected with the inner fan cover via the top connecting nut set.

Preferably, the plurality of support concave frames are arranged annularly at intervals, and the frame grooves on the plurality of support concave frames can be located on a same circumference which is sized to match the size of the heating coil.

Preferably, the frame grooves on the plurality of support concave frames are located on two or more circumferences, each of which is correspondingly clamped with one heating coil. When there are a plurality of heating coils, the heating coils can be arranged in the form of such concentric circles.

An oil receiving plate is further provided in the mounting cavity; the oil receiving plate is located between the fan seat and the inner fan seat and is disk-shaped; gaps are reserved among the upper and lower end faces of the oil receiving plate, the fan seat and the groove; the gaps form an upper smoke overflow passage and a lower smoke overflow passage that are communicated with each other, respectively; and, the oil receiving plate is of a net structure.

The support connection beam includes a support beam frame housing; upper and lower ends of the support beam frame housing are connected to the projection heater and the base, respectively; a smoke collection cavity and an inner operating cavity communicated with each other are provided in the substrate housing; a lower fan is arranged in the inner operating cavity; a support inner beam pipe penetrates through the support beam frame housing; two ends of the support inner beam pipe are in communication with the smoke collection cavity and the dome cavity of the projector housing, respectively; the inner operating cavity is in communication with the oil collection guide cavity; and the grilling pan operating motor is also arranged in the inner operating cavity.

A central beam air cavity is provided between the support inner beam pipe and an inner wall of the support beam frame housing, a plurality of air inlets communicated with the central beam air cavity are formed on a sidewall of the support beam frame housing facing the grilling pan, and an upper end of the central beam air cavity is in communication with the dome cavity of the projector housing. A part of smoke can enter the central beam air cavity from the air inlets, then enters the dome cavity of the projector housing along the central beam air cavity under the action of the smoke exhaust fan, and is finally exhausted from the top of the dome cavity.

A rotary handle is arranged on an outer side of the support connection beam; a lifting rotary clamp rod is provided in the middle beam air cavity; the rotary handle is rotatably connected to the support beam frame housing via a rotating shaft; a poke rod parallel to the rotating shaft is further provided on an inner side of the rotary handle; the lifting rotary clamp rod is arranged vertically and provided with a poking clamp groove; one end of the poke rod is fixedly connected to the rotary handle, while the other end thereof extends into the central beam air cavity and is inserted into the poking clamp groove; during its rotation, the rotary handle can drive the lifting rotary clamp rod to lift up and down via the poke rod; the support connection beam is divided into a vertical section and a connection section; a lower end of the vertical section is fixedly connected to the base, while an upper end thereof is connected to the projection heater via the connection section; the support inner beam pipe successively passes through the vertical section and the connection section; an upper end of the support inner beam pipe is fixedly connected to the connection section, while a lower end thereof can freely rotate relative to the vertical section; connecting plates are provided at connection ends of the vertical section and the connection section, and the two connecting plates are fitted with each other in an up-down direction; a lower locking pin hole is formed on the lower connecting plate, and a plurality of upper locking pin holes are formed on the upper connecting plate; the upper end of the lifting rotary clamp rod always directly faces the lower locking pin hole in an up-down direction; and, when the connection section and the upper inner beam pipe are rotated relative to the support beam frame housing, the plurality of upper locking pin holes on the upper connecting plate can successively directly face the lower locking pin holes in the up-down direction.

Further, through holes communicated up and down are formed on the connecting plates; a lifting cover plate fixedly connected to the lifting rotary clamp rod is provided in the vertical section; and, the lifting cover plate can occlude the through hole on the lower connecting plate when it is lifted up along with the lifting rotary clamp rod.

Beneficial Effects

The present invention has the following beneficial effects. During the grilling process, a very small amount of smoke will be generated. When the smoke is to be exhausted, the smoke can be sucked out by different combinations of the top, the bottom, and the inner side of the support connection beam. The three methods can be used jointly or separately. Accordingly, the smoke will not move to the left, right and front sides of the support connection beam, so that the user will not be bother by smoke. In case where the smoke is no longer troublesome, the power output of the heating coil can be increased. As a result, compared with the prior art, this product is easier to speed up the cooking of food without waiting for a long time.

Unlike the prior art, the connection of the screen outer cover, the heating coil, the heat shield set and the top connection module to the projector housing does not require a large number of screws, so the connecting screen outer cover and the hearing ring can be disassembled easily. In this way, it is very easy to disassemble an oil suction screen or an oil suction tile for cleaning. Moreover, since the edges of the connecting screen outer cover are provided with smooth steel wires, it is difficult to realize fixation and it is easy to slide. After the structure of the present invention is used, such a suspension system is used, in which the center is directly screwed onto the inner fan cover from the bottom, the inner fan cover is then connected to the housing connecting base through a connecting space, and the housing connecting base is then connected to the housing. Two suspension systems will be formed. Unlike the old-fashioned connection structure that is stacked together, this structure has good heat dissipation, and good heat collection; and, the suspended heating tube realizes suspension, but will not be suspended on a reflector to result in the burnout of the reflector.

DETAILED DESCRIPTION OF THE INVENTION

The technical solutions of the present invention will be described below using Examples with reference to the accompanying drawings.

The present invention is implemented by the following technical solutions.

Figure 1:
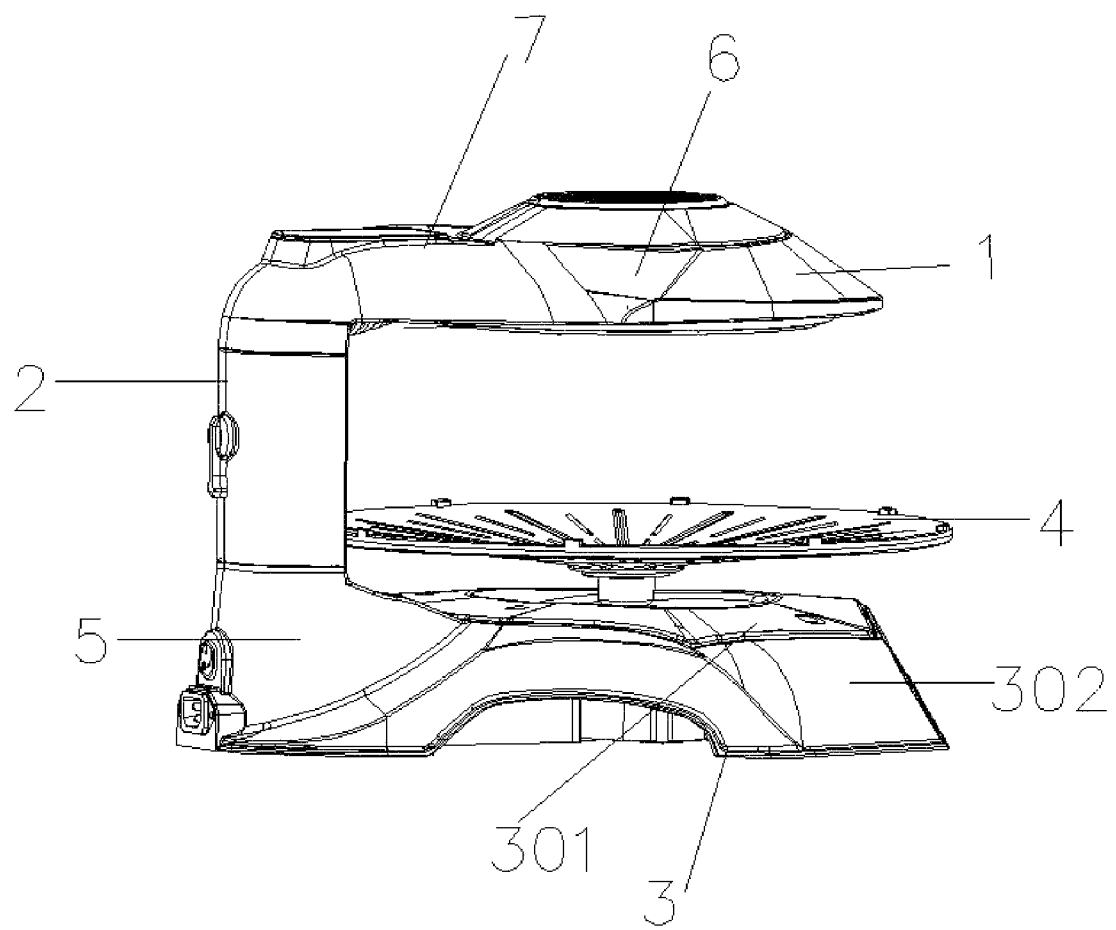
FIG. 1 shows an overall diagram.

Example 1 as shown in FIG. 1, a grill of a top projecting and radiating type includes a projection heater 1, a support connection beam 2, a base 3, and a grilling pan 4 arranged on the base 3, the projection heater 1 being located above the grilling pan 4, the projection heater 1 being fixed on the base 3 via the support connection beam 2, wherein the base 3 includes a substrate housing 302; an upper end face of the substrate housing 302 is provided with an oil collection upper housing 301. A grilling pan rotary motor 314 is arranged in the substrate housing 302. The center of an upper surface of the grilling pan 4 is low and the periphery thereof is high. A rotary socket pipe 402 is fixedly arranged at the bottom center of the grilling pan 4. An electric motor shaft of the grilling pan rotary motor 314 passes through the oil collection upper housing 301 from bottom to top, is inserted into the rotary socket pipe 402 and is then connected to the grilling pan 4 so as to realize the synchronized rotation of the motor shaft and the grilling pan 4. A plurality of holes 405, through which oil can drain, are arranged at intervals around the rotary socket pipe 402 on the grilling pan 4. An upper face of the oil collection upper housing 301 includes recess to form an oil collection guide cavity 310. The bottom of the oil collection guide cavity 310 is provided with an oil drainage hole 313. The holes 405, through which oil drains, are located directly above the oil collection guide cavity 310. A front oil box 304 is arranged inside the substrate housing 302; and, the front oil box 304 is in communication with the oil drainage hole 313.

The grilling pan rotary motor 314 drives the grilling pan 4 to rotate. The projection heater 1 heats food on the grilling pan 4 using infrared radiation. During grilling, oil flows down along the grilling pan 4, and then drops into the oil collection guide cavity 310 through the holes 405. Finally, oil flows into the front oil box 304 for collection through the oil drainage hole 313 in the oil collection guide cavity 310.

Preferably, a raised oil-proof insertion seat 311 is arranged on the bottom of the oil collection guide cavity 310. A lower end of the rotary socket pipe 402 is suited on the oil-proof insertion seat 311. An electric motor shaft of the grilling pan rotary motor 314 passes through the oil-proof insertion seat 311 and is then inserted into the rotary socket pipe 402. The oil-proof insertion seat 311 is higher than other positions in the oil collection guide cavity 310, so that oil is prevented from leaking into the gap between the electric motor shaft and the oil collection upper housing 301.

Preferably, the projection heater includes a projector housing 101, a connecting screen outer cover 102, a heating coil 103, a heat shield set 104, and a smoke exhaust fan. The projector housing 101 is of a dome structure having a concave or arc-shaped cross section. The heat shield set 104 includes a housing connecting base 118, an outer heat shield 117, and an inner fan cover 115, which are successively arranged from top to bottom in a dome cavity 606 inside the projector housing 101. The top of the projector housing 101 is a vent cover 120. A plurality of vent holes are formed on the vent cover 120. An upper end of the housing connecting base 118 is fixedly connected to the vent cover 120 via a first fastener. A lower end of the housing connecting base 118 is fixedly connected to the outer heat shield 117 via a second fastener 521, and the lower end face and the outer heat shield 117 are fixedly connected together by a top connecting nut set of the inner fan cover 115. The housing connecting base 118 is provided with a fan seat mounting through hole 126. The outer heat shield 117 is provided with a fan opening A125. An upper end face of the inner fan cover 115 is recessed downwards to form a groove. The fan seat mounting through hole 126 and the fan opening A125 are lined up to form a mounting cavity with the groove. A fan seat 116 is arranged in the mounting cavity, and the smoke exhaust fan is arranged on the fan seat 116. A plurality of wind holes are distributed in a vortex (swirl) pattern on the bottom of the groove. The connecting screen outer cover 102 is arranged below the inner fan cover 115 and is fixedly connected to the inner fan cover 115 via a top connecting nut set. The heating coil 103 is located between the connecting screen outer cover 102 and the inner fan cover 115. The connecting screen outer cover 102 includes a cover body 106, a connecting disk 107 and support concave frames 109. The cover body is hollow and the connecting disk 107 is fixed at the center of the cover body. The plurality of support concave frames 109 are fixedly arranged on one face of the cover body facing the heating coil 103. Frame grooves 114 are provided on the support concave frames 109. The heating coil 103 is clamped in the frame grooves 114 on at least two support concave frames 109. The connecting disk 107 is fixedly connected with the inner fan cover 115 via the top connecting nut set.

An oil receiving plate is further provided in the mounting cavity. The oil receiving plate is located between the fan seat and the inner fan and is plate-shaped. Gaps are provided between the upper and lower faces of the oil receiving plate, the fan seat, and the groove. The gaps form an upper smoke overflow passage and a lower smoke overflow passage, which are in communication with each other and are used for allowing smoke to pass therethrough. Oil droplets are received or absorbed and blocked by the oil receiving plate. This technology is similar to the principle of operation of the existing range hoods.

The projection heater 1 further includes a vent cover seat 119 that is matched with the top of the projector housing 101 in shape. The vent cover seat 119 covers the top of the projector housing 101. A fan top hole 124 is formed at the top center of the vent cover seat 119. A vent cover 120 is located in the fan top hole 124. The vent cover seat 119 covers the outer surface of the projector housing.

Preferably, the plurality of support concave frames 109 are arranged annularly at intervals. The frame grooves 114 on the plurality of support concave frames 109 can be located on a same circumference, which is sized to match the size of the heating coil 103. Or, the frame grooves 114 on the plurality of support concave frames 109 are located on two or more circumferences, each of which is to clamp one heating coil 103. When there are a plurality of heating coils 103, the heating coils can be arranged in the form of such concentric circles.

Preferably, the support connection beam 2 includes a support beam frame housing 201. The upper and lower ends of the support beam frame housing 201 are connected to the projection heater 1 and the base 3, respectively. A smoke collection cavity 305 and an inner operating cavity 303 in communication with each other are provided in the substrate housing 302. A lower fan is arranged in the inner operating cavity 303. A support inner beam pipe 203 is provided in the support beam frame housing 201. Two ends of the support inner beam pipe 203 are in communication with the smoke collection cavity 305 and the dome cavity 606 of the projector housing 101, respectively. The inner operating cavity 303 is in communication with the oil collection guide cavity 310. A central beam air cavity 206 is provided between the support inner beam pipe 203 and an inner wall of the support beam frame housing 201. A plurality of air inlets 205 in communication with the central beam air cavity 206 are formed on a sidewall of the support beam frame housing 201 facing the grilling pan 4. An upper end of the central beam air cavity 206 is in communication with the dome cavity 606 of the projector housing 101. Some smoke can enter the central beam air cavity 206 from the air inlets 205, then enters the dome cavity 606 of the projector housing 101 along the central beam air cavity 206 under the action of the smoke exhaust fan, and is finally exhausted from the top of the dome cavity 606. A rotary handle 513 is arranged on an outer side of the support connection beam 2. A lifting rotary clamp rod 514 is provided in the central beam air cavity 206. The rotary handle is rotatably connected to the support beam frame housing via a rotating shaft. A poke rod parallel to the rotating shaft is further provided on an inner side of the rotary handle. The lifting rotary clamp rod is arranged vertically and provided with a poking clamp groove. One end of the poke rod is fixedly connected to the rotary handle, while the other end thereof extends into the central beam air cavity 206 and is inserted into the poking clamp groove. During its rotation, the rotary handle can drive the lifting rotary clamp rod to lift up and down via the poke rod. The support connection beam 2 is divided into a vertical section and a connection section. A lower end of the vertical section is fixedly connected to the base, while an upper end thereof is connected to the projection heater 1 via the connection section. The support inner beam pipe successively passes through the vertical section and the connection section. An upper end of the support inner beam pipe is fixedly connected to the connection section, while a lower end thereof can freely rotate relative to the vertical section. Connecting plates are provided at connection ends of the vertical section and the connection section, and the two connecting plates are fitted with each other in an up-down direction. A lower locking pin hole is formed on the lower connecting plate, and a plurality of upper locking pin holes are formed on the upper connecting plate. The upper end of the lifting rotary clamp rod always directly faces the lower locking pin hole in an up-down direction. When the connection section and the upper inner beam pipe are rotated relative to the support beam frame housing, the plurality of upper locking pin holes on the upper connecting plate can successively directly face the lower locking pin holes in the up-down direction.

Through holes communicating up and down are formed on the two connecting plates. A lifting cover plate 523 fixedly connected to the lifting rotary clamp rod 514 is provided in the vertical section. The lifting cover plate can occlude the through hole on the lower connecting plate when it is lifted up along with the lifting rotary clamp rod 514.

Examples of the Invention

Example 2

Figure 2:
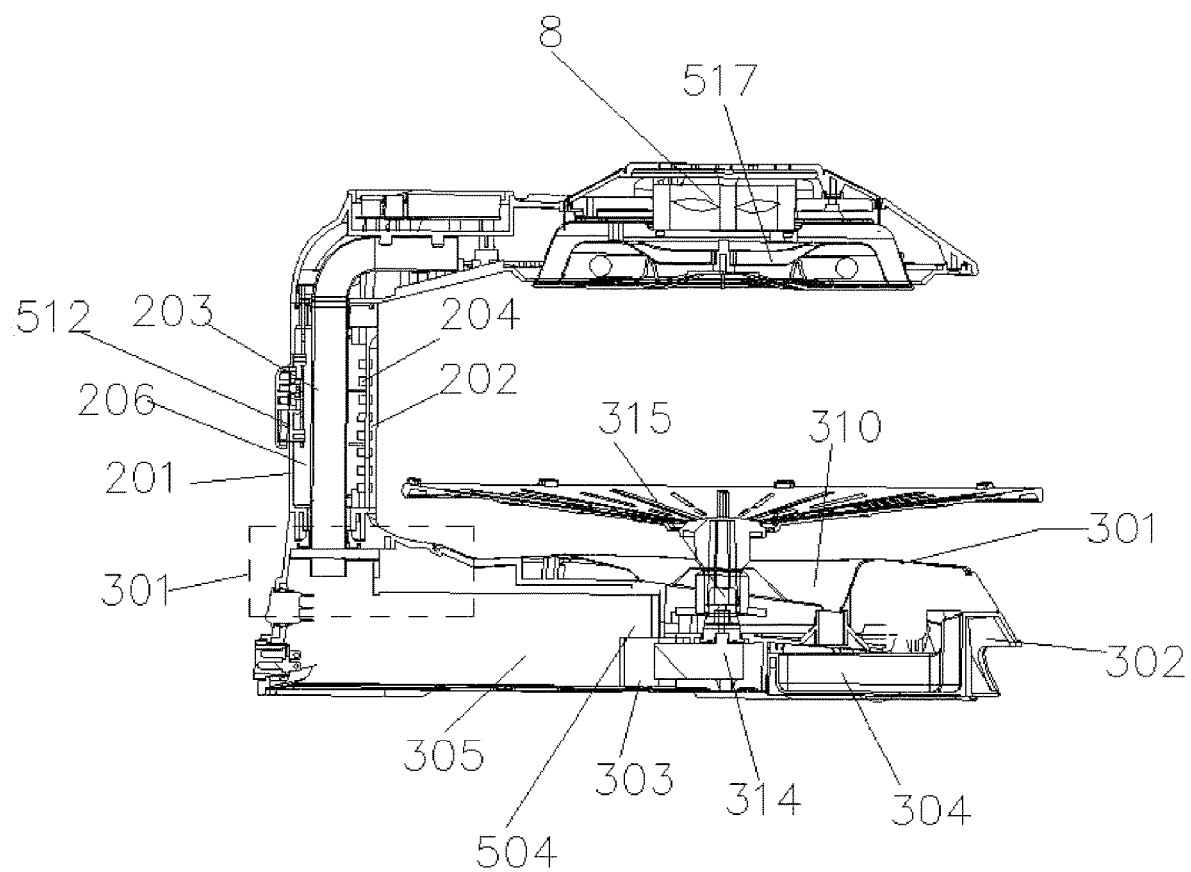
FIG. 2 shows an overall anatomical diagram.

As shown in FIG. 2, a grill of top projecting and radiating type includes a projection heater 1, a support connection beam 2, a base 3, and a grilling pan 4. A support insertion seat 5 is provided on a side edge of the base. The support connection beam is arranged vertically upwards in the support insertion seat. The support connection beam supports and connects the projection heater. The projection heater is arranged transversely. The projection heater, the support connection beam, and the base form a sideway U-shaped structure. The grilling pan is arranged on the base directly below the projection heater. The projection heater and the grilling pan are arranged in parallel at an upper and lower locations, respectively. The infrared radiation from the infrared heating coil in the projection heater is maximally projected onto the grilling pan to grill food.

Figure 3:
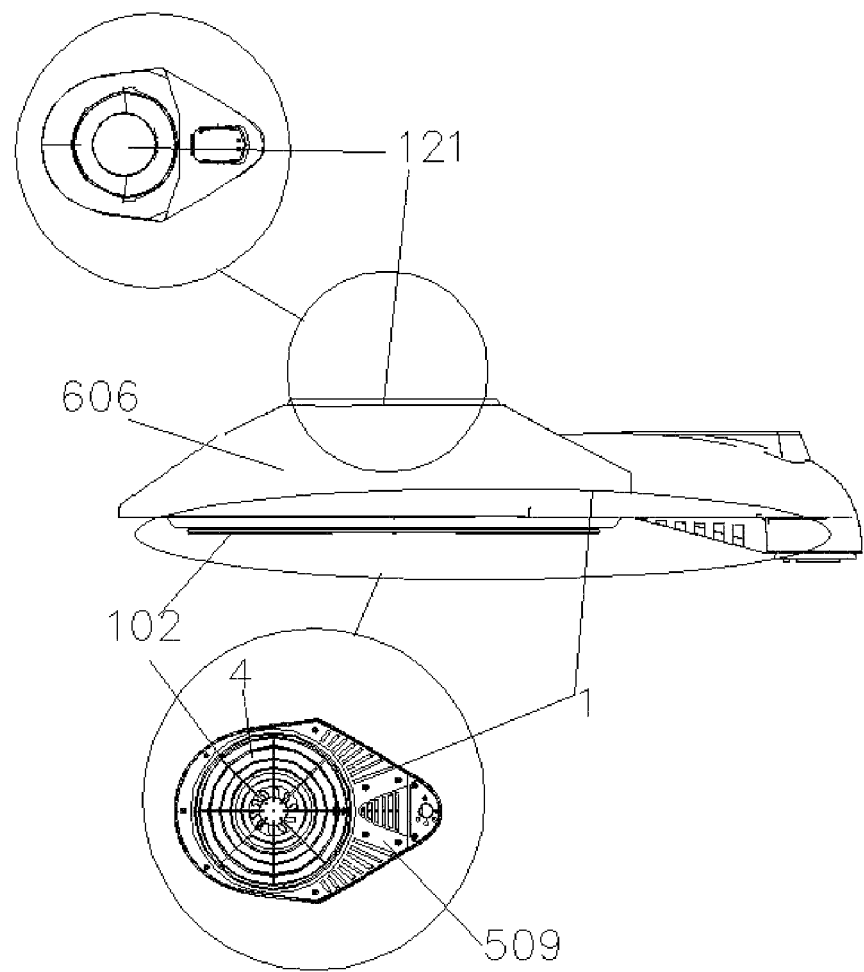
FIG. 3 shows a structural diagram of a projection heater.
Figure 12:
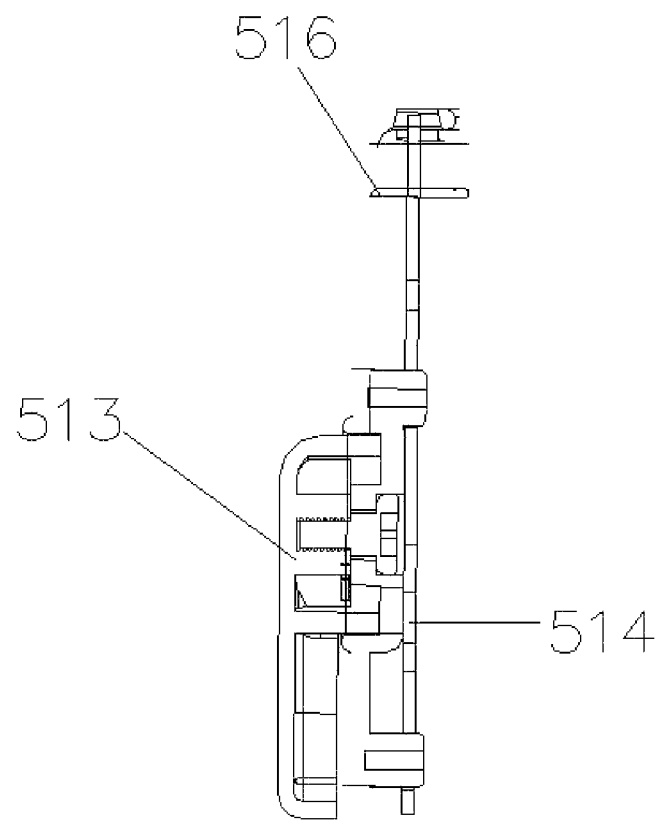
FIG. 12 shows a structural diagram of a steering lock.

As shown in FIGS. 3 and 12, the projection heater includes a projection heating portion 6 and an insertion connection portion 7. The insertion connection portion is integrally extended out from the rear of the projection heating portion. The insertion connection portion is spliced (joined) with the top of the support connection beam.

The projection heating portion is generally in a round shape or a polygonal shape. The insertion connection portion is an integral rearward extension of the projection heating portion and has a generally triangular or trapezoidal profile.

As shown in FIG. 2, the projection heating portion comprises a projector housing 101, a connecting screen outer cover 102, a heating coil 103, a heat shield set 104 and a top connection module 105. The projector housing is of a dome structure having a concave or arc-shaped cross section. A top connection module 105, a heat shield set 104, and the heating coil 103 are arranged, from top to bottom, in a dome cavity 606 inside the projector housing. The bottom of the dome cavity of the projector housing is finally covered by the connecting screen outer cover 102 from below.

As shown in FIGS. 3-8, the connecting screen outer cover includes a cover body 106, a connecting disk 107, a top connecting nut set 108, and support concave frames 109. The top of the cover body faces upwards, and four support concave frames are symmetrically arranged at upper, lower, left and right positions on the cover body. A connecting disk is welded at the center of the cover body, and a bolt hole A110 is formed at the center of the connecting disk. The top connecting nut set is arranged above the bolt hole A. The top connecting nut set includes a mountain-shaped stud 111 and a limiting pipe 112. A screw post 113 is arranged at the head of the mountain-shaped stud, and a lower end of the mountain-shaped stud is a screw tube. A screw on the bottom of the connecting disk is screwed into the screw tube of the mountain-shaped stud through the nut hole A, and the connecting disk is connected to the top connecting nut set.

The top connecting nut set is screwed upwards into a center suspension screw hole seat 128 of the inner fan cover 115. During the screwing process, the heating coil is erected in frame grooves 114 of the support concave frames, the heating coil is buckled in the frame grooves, and the heating coil is clamped between the connecting screen outer cover and the inner fan cover along with the connection of the connecting screen outer cover and the inner fan cover.

Figure 4:
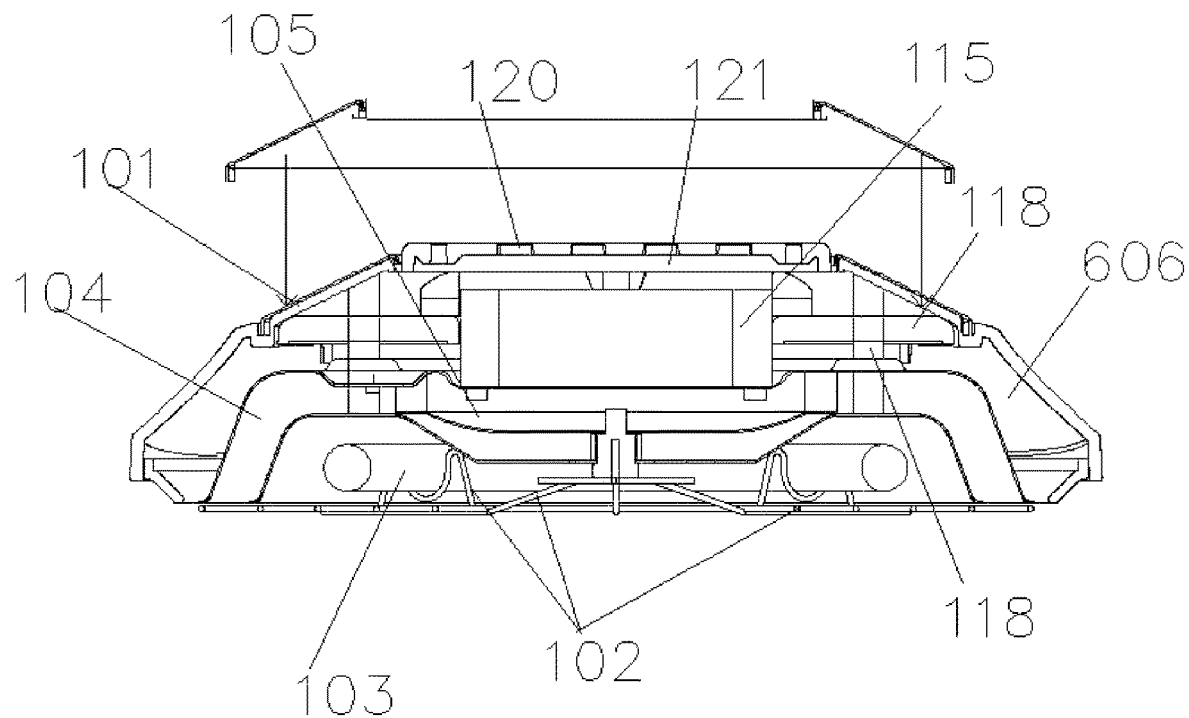
FIG. 4 shows an anatomical diagram of the projection heater.
Figure 5:
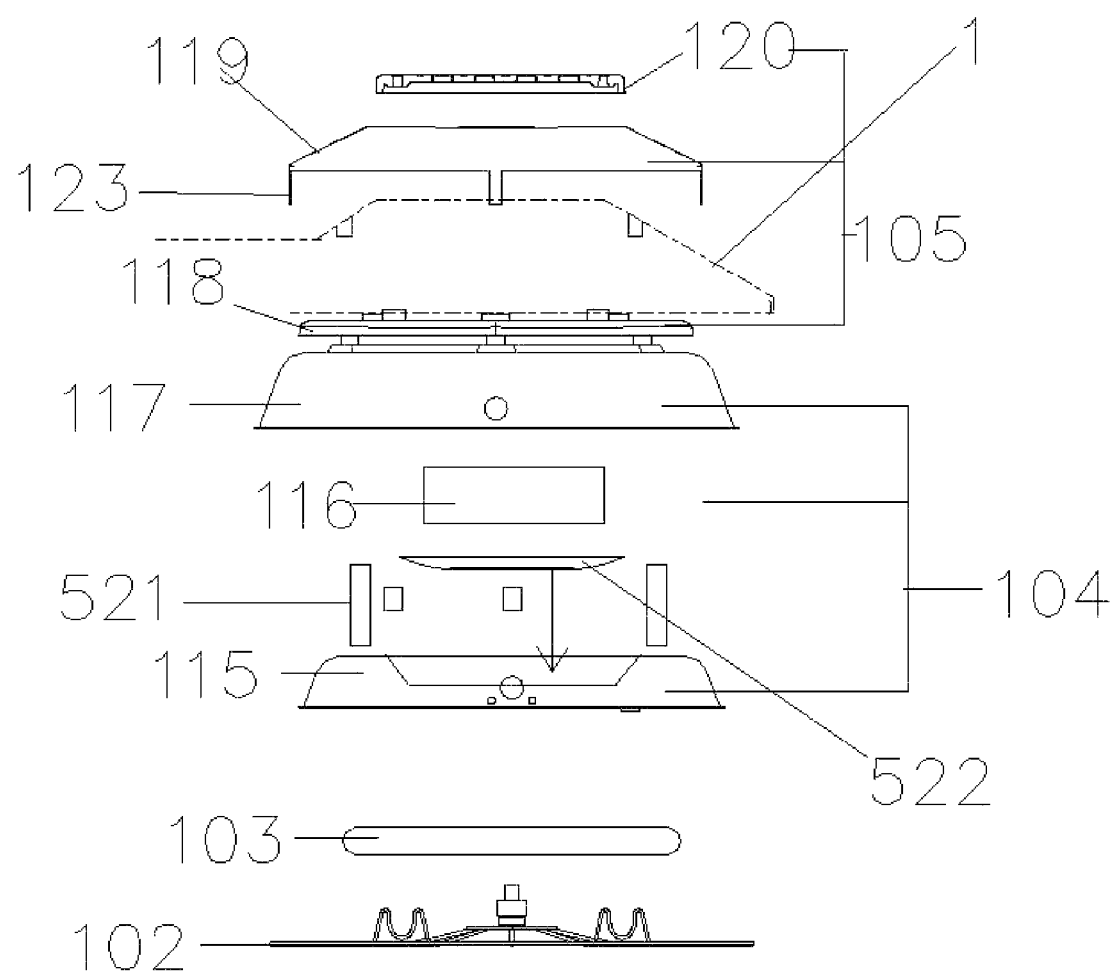
FIG. 5 shows an exploded view showing the connection of the overall internal structure of a projection heating portion.
Figure 6:
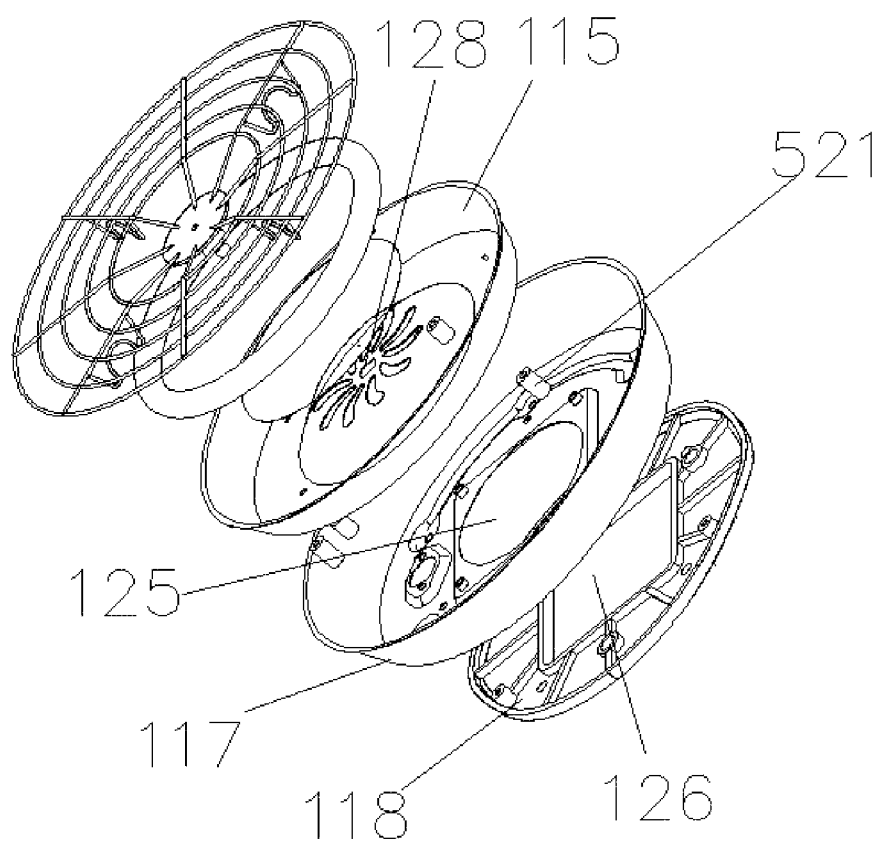
FIG. 6 shows a bottom exploded view showing the connection of the overall internal structure of the projection heating portion.
Figure 7:
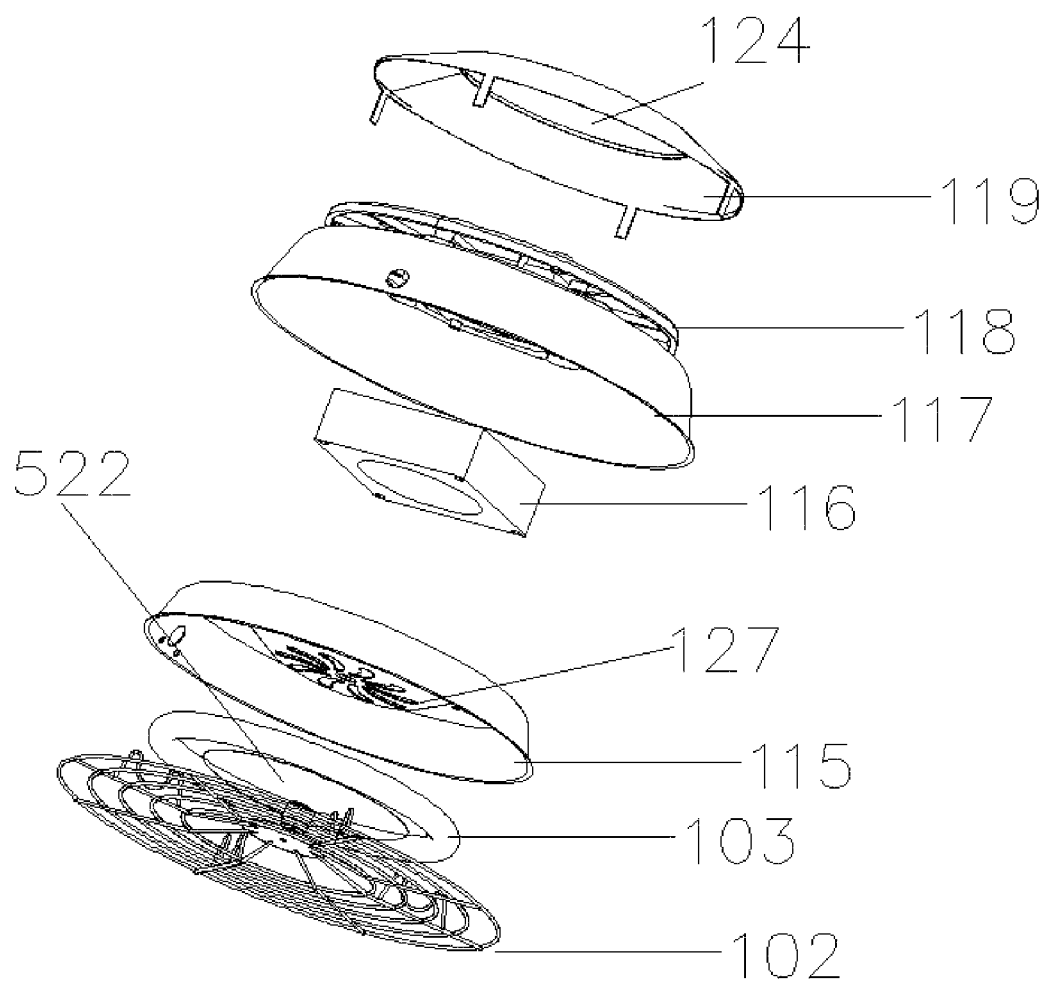
FIG. 7 shows a stereoscopic exploded view showing the overall interior of the projection heating portion.
Figure 8:
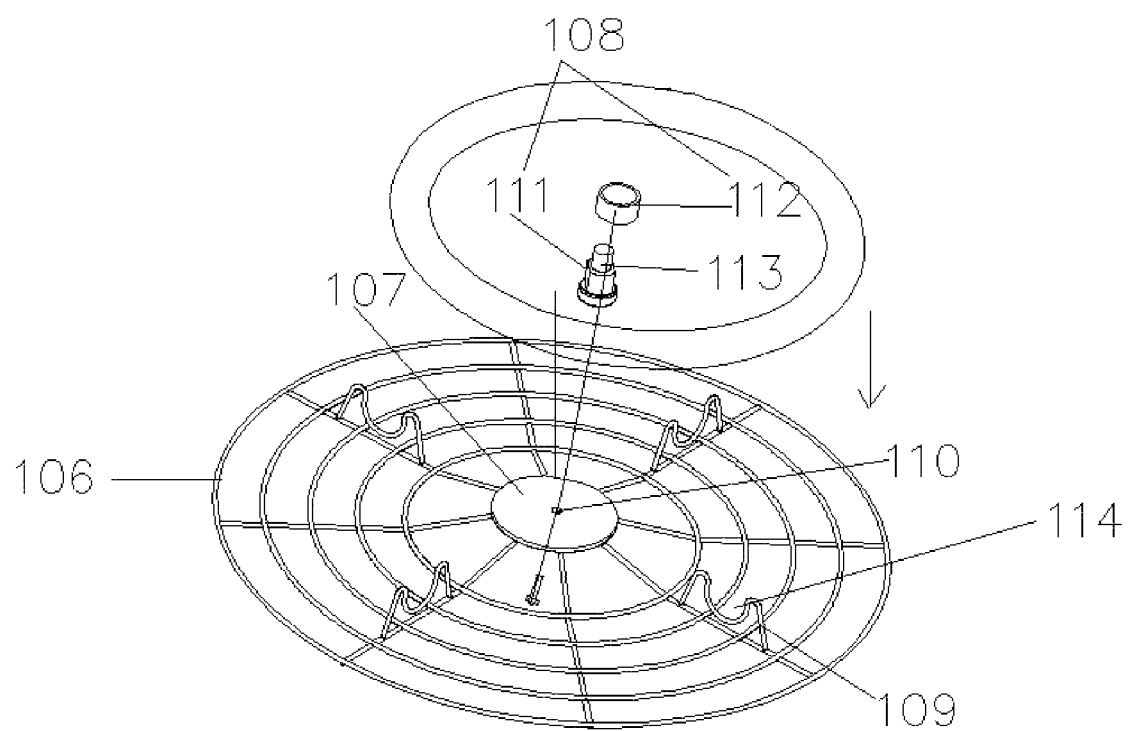
FIG. 8 shows a structural diagram of the connection of a connecting screen outer cover.

The connection and assembly mode for the projection heater is as follows. A vent ring hole 121 is formed at the top center of the dome cavity of the projector housing. The vent cover is buckled on the vent ring hole 121 in a manner matching the position of the vent cover seat. Subsequently, the components other than the vent cover in top connection module are mounted through the interior of the projector housing, i.e., the bottom of the vent cover. The top connection module includes a housing connecting base 118, the vent cover seat 119 and the vent cover 120. The top of the vent cover seat is protruded, and a fan top hole 124 is formed at the center of the vent cover seat. The fan top hole is matched in position with the vent ring hole. The bottom of the vent cover seat is provided with a buckle or a screw post 123 to be buckled or screwed onto the top of the vent cover seat. The vent cover seat may also be directly buckled into a sleeve groove, around the circumference of the vent ring hole, on the projector housing. The vent cover seat is made of a metal material, and can insulate the heat on the top to realize the low temperature of the top of the projection heater no manner when the vent cover seat is arranged inside or outside the projection heater, as shown in FIG. 4.

Screw posts are provided on the top of the housing connecting base and below the housing connecting base. A fan seat mounting through hole 126 is formed at the center of the housing connecting base. The screw post on the top is screwed into a screw post or stud on the inner side of the projector housing, and the screw post on the bottom is in screwed connection to the top of the outer heat shield.

The heat shield set includes an inner fan cover 115, a fan seat 116 and an outer heat shield 117. A fan opening A 125 is formed at the center of the outer heat shield. A downward-recessed turbine wind hole 127 is formed at the center of the inner fan cover. A connecting stud is arranged around the turbine wind hole. A screw is inserted into a screw through hole on the fan seat after passing through a through hole on the connecting stud, so as to fix the fan seat on the top of the inner fan cover, and the fan seat is protruded from a fan seat mounting through hole 126 after passing through the fan opening A 125 under the cover of the outer heat cover and is close to a vent cover. A smoke exhaust fan is arranged in the fan seat. A screw post and a spacer are arranged, round the fan opening A, on the outer heat shield to separate the outer heat shield from the fan opening A. The heat shield set is first connected by screws; the heating coil is placed in the connecting screen outer cover; the mountain-shaped stud of the connecting disk at the center of the connecting screen outer cover is connected by screws, then screwed into the nut hole A on the inner fan cover, continuously buckled on the oil absorption screen or the oil absorption tile after passing through the nut hole A, and finally suspended on the center suspension screw hole seat 128 of the outer heat shield by the stud on the top of the inner fan cover. Thus, this structure is mounted, and a cover body structure having upper and lower layers is formed. If the projector housing is included, the dome structure having three layers is formed. The structure is high in firmness and mounting simplicity and very clear in layering.

The number of heating coils is matched with the number of circles of support concave frames. Every three to four support concave frames are arranged on one circumferential line at equal angles from each other, so that the 360° connecting screen outer cover is equally divided into 3 to 4 parts. If the support concave frames are arranged in two circles, two heating coils can be mounted for realizing higher power.

The principle will be described below. As shown in FIG. 4, the whole projection heater will form two suspension systems. That is, the heat shield set and the top connection module will be distributed into two sets, i.e., a set using the smoke exhaust fan as a core and another set using the connecting screen outer cover and the heating coil as a core, in order to separate the heat dissipation of the smoke exhaust fan and the heating of the heating coil. Unlike the old-fashioned connection structure that is stacked together, this structure has good heat dissipation, and good heat collection; and, the suspended heating tube realizes suspension, but will not be suspended on a reflector to result in the burnout of the reflector. Moreover, the situation of poor reflectivity since the infrared rays emitted from the rear is too closed to the reflector in the prior art will not occur.

Figure 9:
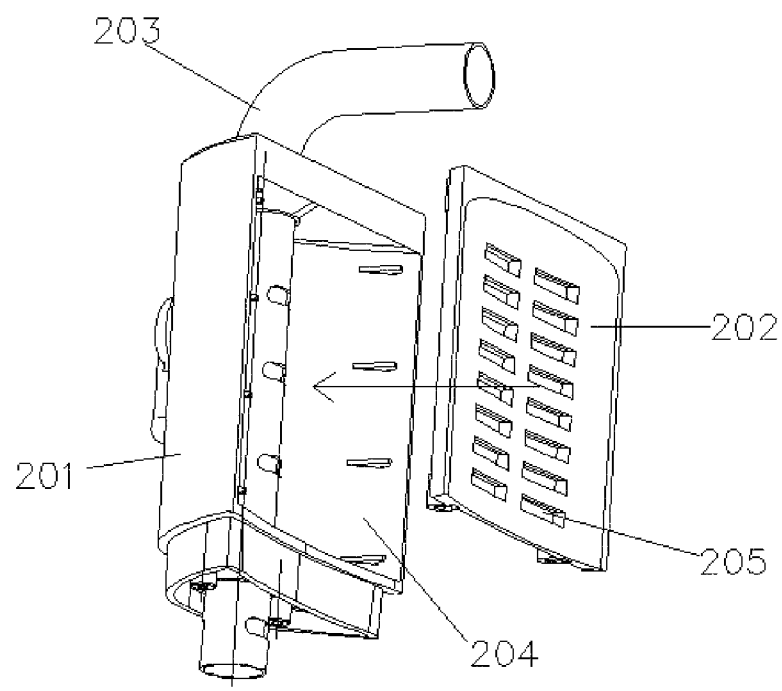
FIG. 9 shows a structural diagram of a support connection beam.

As shown in FIG. 9, the support connection beam includes a support beam frame housing 201, a front air inlet plate 202 and a support inner beam pipe 203). The support beam frame housing is arc-shaped, semi-circular or ⊏-shaped, and an air inlet 204 is formed at the front end of the support beam frame housing. The front air inlet plate is buckled or inserted into the air inlet. The front air inlet plate and the support beam frame housing form a central beam air cavity 206. The front air inlet plate is hollowed out to from a plurality of smoke inlet holes 205. The support inner beam pipe is vertically inserted into the support beam frame housing. In such a design, firstly, the metal pipe with high hardness supports the whole support connection beam and the projection heater and thus bears a large weight; secondly, the upward transportation of the very concentrated bottom air can be realized by the support inner beam pipe, thereby increasing the air pressure; and thirdly, the support beam frame housing and the front air inlet plate can form the middle beam air cavity, and the air cavity can absorb smoke from the grilling pan into the support beam.

Figure 10:
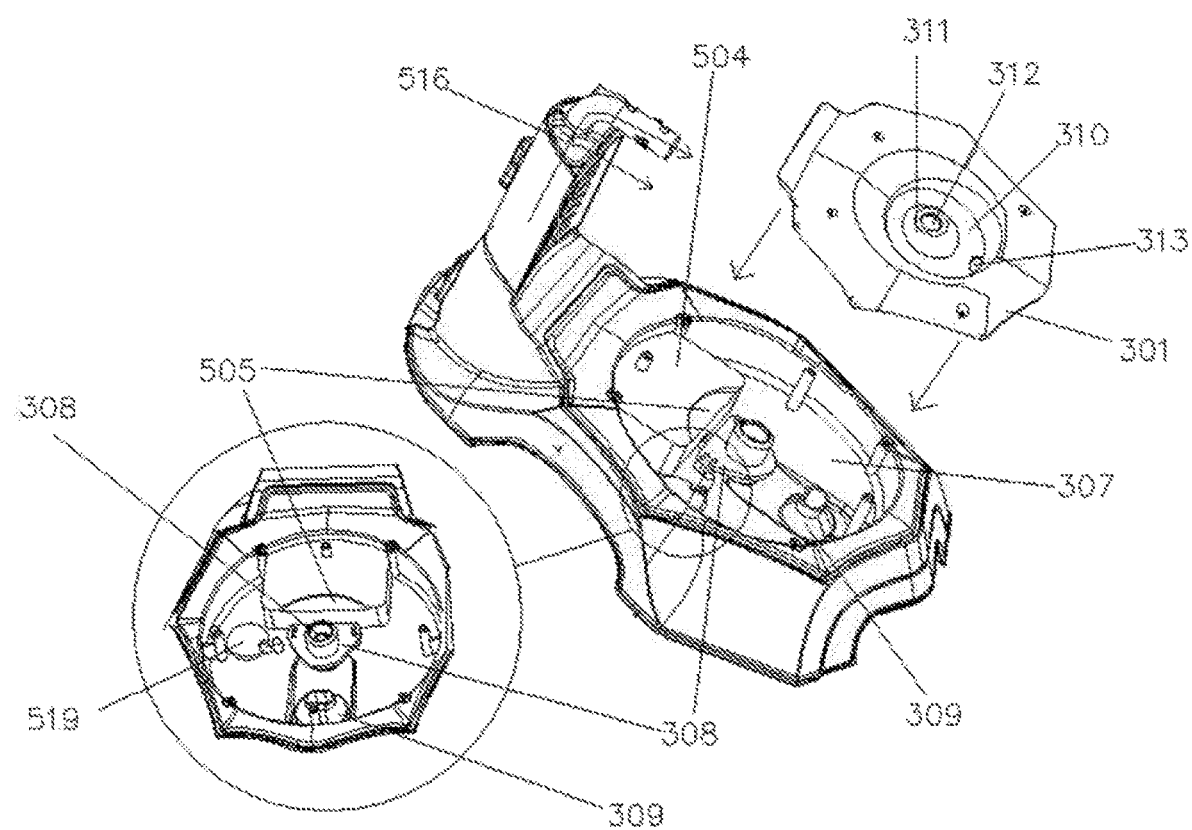
FIG. 10 shows a structural diagram of a base.
Figure 11:
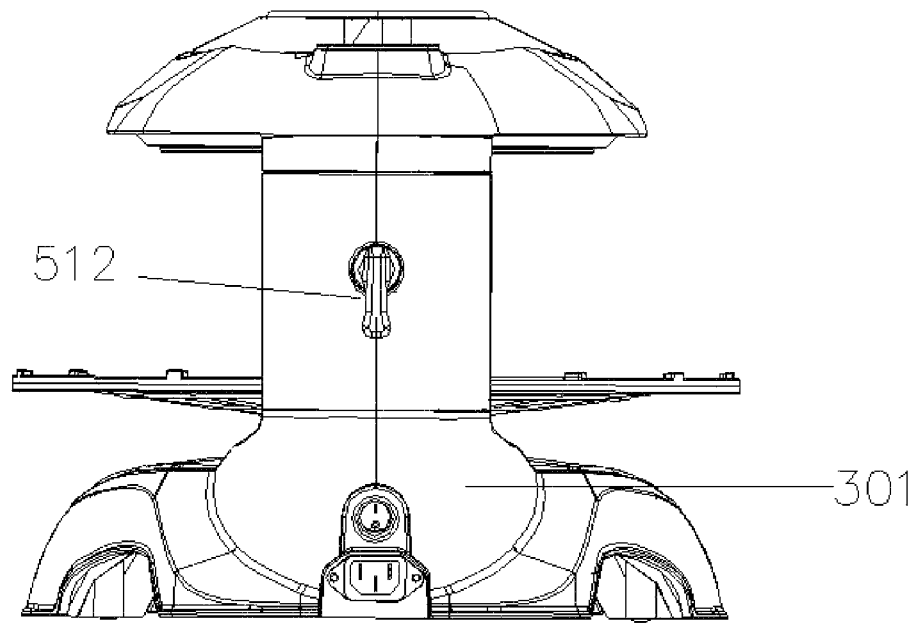
FIG. 11 shows an overall front view.

As shown in FIGS. 2 and 10, the base comprises an oil collection upper housing 301, a substrate housing 302, an inner operating cavity 303, a front oil box 304, a smoke collection cavity 305 and a support insertion seat 306. The front end of the oil collection upper housing is recessed downwards to form an oil cavity placement seat 307. A rotary base 308 and an oil guide lower bucket 309 are arranged in the oil cavity placement seat. The oil collection upper housing is fitted onto the substrate housing. The substrate housing is recessed downwards to form an oil collection guide cavity 310. A protruded oil-proof insertion seat 311 is arranged at the center of the oil collection guide cavity. A grilling pan insertion pipe upper hole 312 is formed at the center of the oil-proof insertion seat. The set position of the oil-proof insertion seat is matched with the rotary base, and the oil-proof insertion seat and the rotary base are spliced or covered with each other. The set shape and position of the gripping pan insertion pipe upper hole are matched with the rotary base. The front end of the oil-proof insertion seat is provided with an oil drainage hole 313 that is matched with the position and shape of the oil guide lower bucket. The front oil box is suspended at the lower end of the substrate housing at the set position of the oil guide lower bucket. The inner operating cavity is integrally molded and arranged at the rear end of the front oil box. A grilling pan rotary motor 314 is arranged below the position of the inner operating cavity matched with the support insertion seat. A shaft of the grilling pan rotating motor is inserted into the support insertion seat, and is connected and clamped with a rotary driving shaft 315 arranged in the support insertion set to drive the rotary driving shaft to rotate. The smoke collection cavity is integrally molded with the substrate housing and is arranged at the lower end of the substrate housing matched with the set position of the support insertion seat. In the rear of the inner operating cavity, a driving wind duct 316 is provided at the head of the smoke collection cavity to communicate with a base fan 317. The tail end of the smoke collection cavity is in communication with the support insertion seat, and the tail end of the support inner beam pipe is extended into the tail end of the smoke collection cavity.

Figure 13:
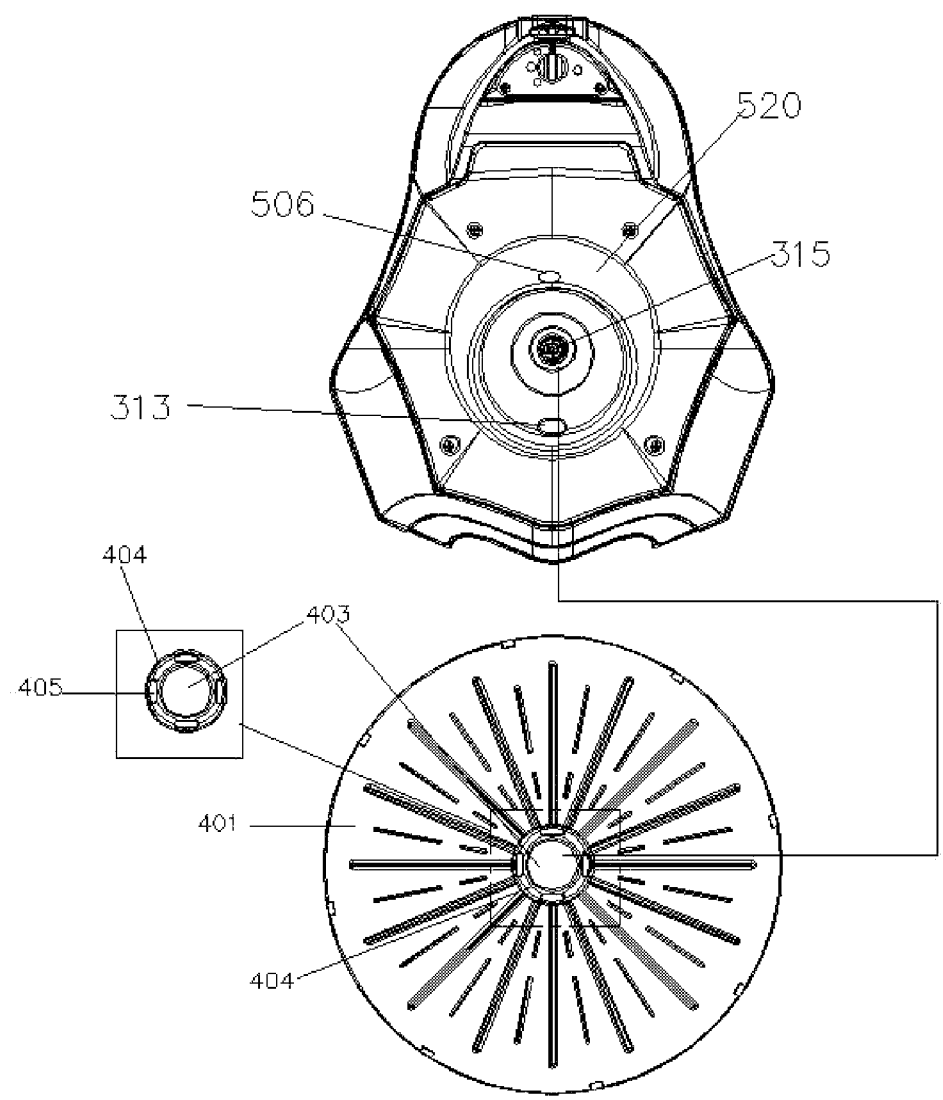
FIG. 13 shows a structural diagram of the connection of a grilling pan and the base.
Figure 14:
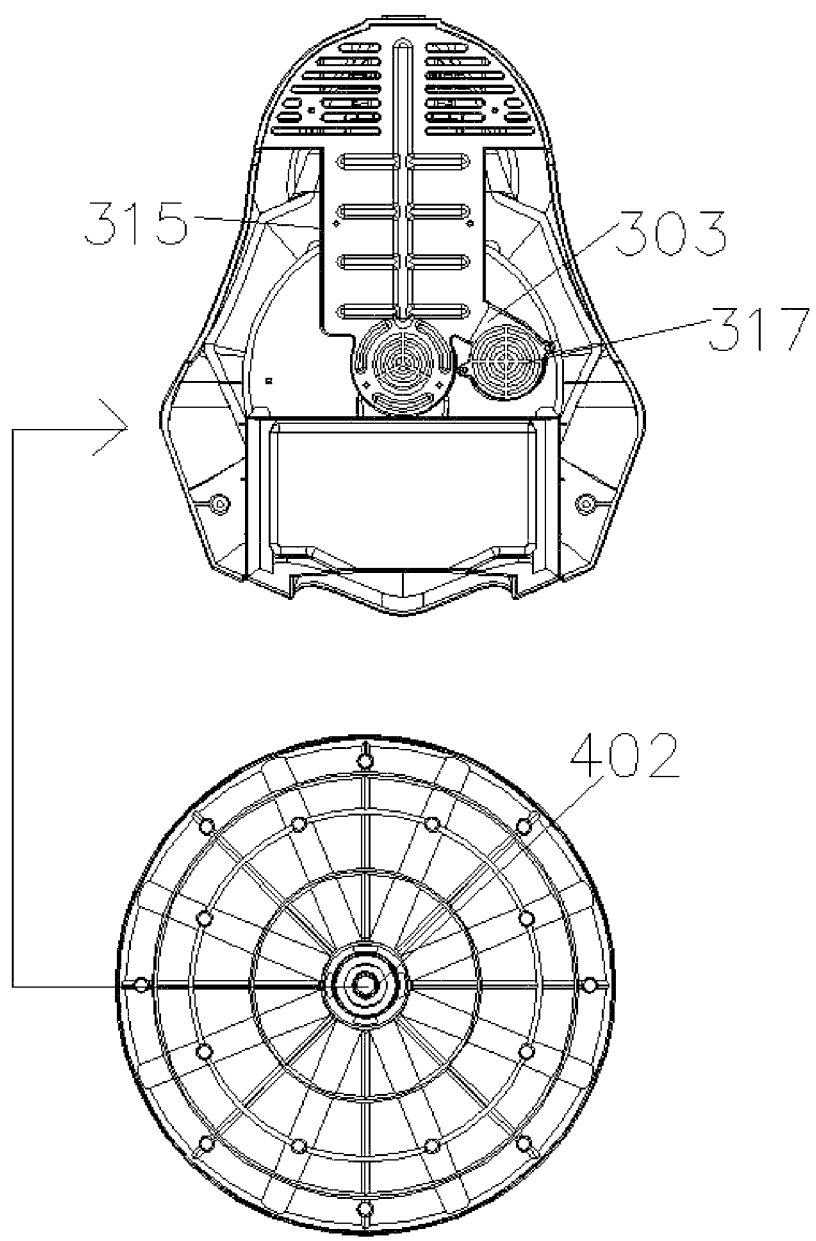
FIG. 14 shows a bottom view of the connection of the grilling pan and the base.
Figure 15:
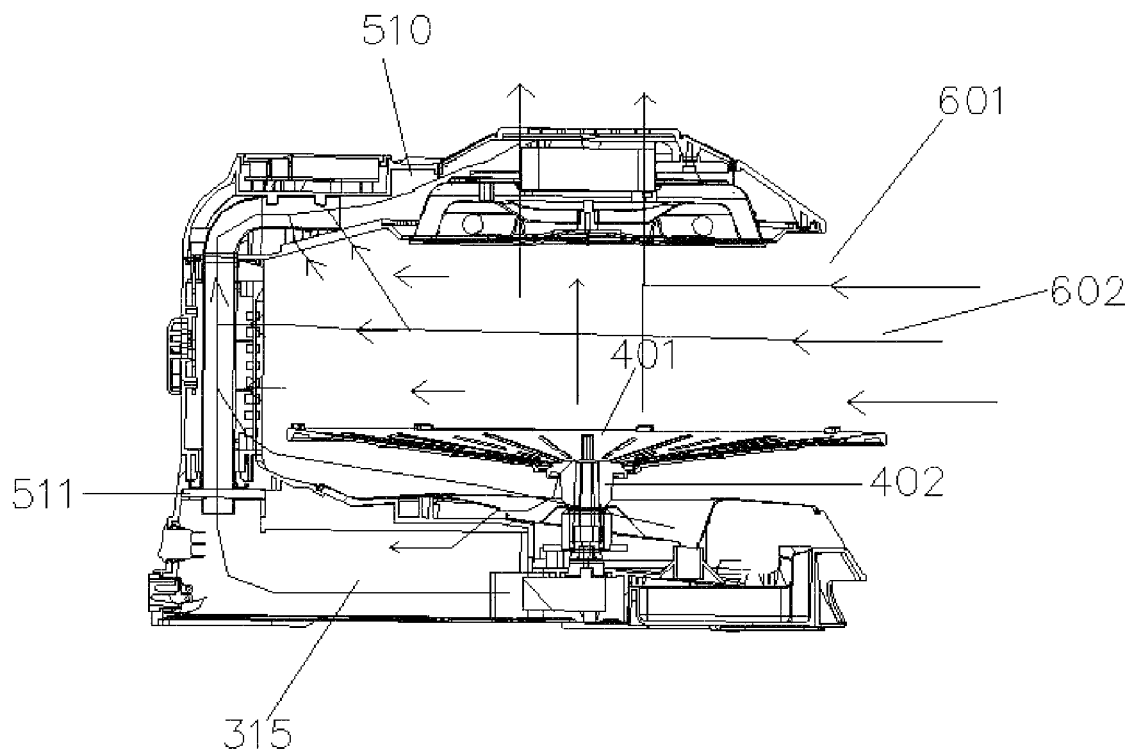
FIG. 15 shows a schematic diagram of smoke exhaust.

The collection and flow of waste oil is shown in FIGS. 2, 13 and 14. The grilling pan includes a pan body 401 and a rotary socket pipe 402 arranged at the bottom center of the pan body. The pan body and the rotary socket pipe are integrally molded of a metal material. The rotary socket pipe is inserted into a rotary base via the oil-proof insertion seat, supported by the oil-proof insertion seat and sleeved with a rotary driving shaft in the rotary base, and is driven to rotate by a grilling pan rotating motor under the linkage of the rotary driving shaft. An oil distribution convex cover 403 is hermetically provided on the top of the rotary insertion pipe. An oil collection groove circle 404 is arranged around the oil distribution convex cover, and a plurality of holes 405 through which oil drops are formed in the oil collection groove circle. The grilling pan is rotatable, and the top of the rotary insertion pipe is sealed. The main body of the grilling pan is a cylinder with a wide mouth which is made of a metal material, and the interior of the grilling pan is hollow, so that the grilling pain is in a trumpet mouth shape. Waste oil during the grilling process will flow into the oil collection groove circle around the oil distribution convex cover through the slope structure of the trumpet. Because the holes 405, through which oil drops, are formed in the oil collection groove circle, the waste oil drops into the oil collection guide cavity of the bottom oil collection upper housing from the holes 405, through which oil drops. As shown in FIG. 2, the oil collection guide cavity is inclined forwards, the oil drainage hole is formed at a position with the lowest slope on the oil collection upper housing, and the oil drainage hole is in communication with the oil guide lower bucket to the front oil box. Specifically, the bottom of the oil drainage hole is integrally molded and extended to form a pipe body, and the pipe body is inserted into the oil guide lower bucket, so that a collection pipe bucket body with high sealing performance is completed formed. As a result, no oil leakage will occur, and the waste oil flows into the front oil body through the oil guide lower bucket.

As shown in FIG. 10, an oil cavity air suction platform 519 is convexly arranged at a position on the top of the base fan matched with the oil cavity placement seat, and at least one air suction hole is formed on the oil cavity air suction platform. The use of the air suction hole for negative-pressure air suction can accelerate the temperature inside the cavity formed by the oil cavity placement seat. The temperature comes from the front oil box. Accordingly, the service life problem caused by the close distance from the front oil box to the main motor and the fan can be ensured. Also, the waste oil can be cooled. Meanwhile, the oil collection upper housing 301 can ensure that its own temperature can be continuously absorbed by the lower cavity, and the waste oil flowing on the surface is also cooled.

Preferably, the pan body of the grilling pan has a circular front cross section, a surface coated with an anti-smoke and anti-sticking coating and a conical vertical anatomical face; the conical shape has a small-diameter bottom and a large-diameter top to from a trumpet mouth shape; a plurality of oil guide slots 501 are dispersedly arranged on the surface of the pan body by using the oil distribution convex cover as an axis; and, the oil guide slots comprise convex slot lines 502 and concave slot lines 503, and the convex slot lines 502 and the concave slot lines 503 are arranged alternately. The oil slots are mainly slot paths capable of realizing the flow of waste oil. The uneven surface can also enhance the effect of uniformly cooling the surface of food and prevent the generation of smoke caused by charring. The support inner beam pipe includes a support straight pipe 507 and a bent beam conduit 508, between which a connecting rotating shaft sleeve 509 is provided. The support inner beam pipe supports the projection heater transversely arranged on the top of the support connection beam, and the support inner beam pipe and the projection heater are separate from each other. The projection heater relies upon the connecting rotating shaft sleeve to rotate about the support straight pipe. A vent plate 509 is provided at an opening on the bottom of the insertion connection portion, a wind inlet hole or a wind inlet groove is formed on the vent plate, and the vent plate and the main body of the insertion connection portion form a top negative-pressure air cavity 510. When the smoke exhaust fan in the top fan seat exhausts wind upwards, there is a cavity between the vent cover and the fan seat. This cavity is connected to the top negative-pressure air cavity, and air on the bottom of the base is sucked or exhausted by the base fan through the support inner beam pipe and then sucked or exhausted by the fan to realize a strong mobility, so that the smoke is discharged from the vent cover on the top.

A bottom airtight plate 511 is provided between the bottom of the support connection beam and the support insertion seat, and a through hole for allowing the support straight pipe to be inserted therein is formed on the bottom airtight plate. The bottom airtight plate is provided to isolate the central beam air cavity from the smoke collection cavity in the support beam frame housing. Due to the negative pressure, the size of the exhaust port should be reduced as far as possible, and the strength of air exhaust should be increased, so that the negative-pressure air on the bottom can be discharged into the projection heater on the top only through the support inner beam pipe with maximum efficiency.

The multifunctional smoke suction principle of a special flue will be described below. As shown in FIGS. 2, 4, 9 and 15, only the smoke exhaust fan in the projection heater is activated, and the smoke exhaust fan exhausts smoke upwards, so air will be pumped out from the interior of the projection heater by the turbine wind hole, and the temperature inside the projection heater is thus reduced. The temperature reduction will not influence the hear radiation effect of the infrared ray, but can realize smoke suction. As shown in the first wind line 601, smoke will rises from the surface of the grilling pan, and is then sucked into the projection heater by the continuously-supplemented negative air pressure and discharged from the vent cover on the top by the smoke exhaust fan.

The second situation is also the continuation of the above situation. The smoke continues to move backwards. As shown in the second line 602, the top negative-pressure air cavity is in communication with the smoke exhaust fan to such the smoke. The top negative-pressure air cavity is easily manufactured, as long as the flue space is reserved and communicated with the top of the fan seat during the housing shaping of the top of the top negative-pressure air cavity.

The third situation is the continuation of the first and second situations. In the case where the top of the support connection beam is in communication with the top negative-pressure air cavity, smoke will be sucked into the central beam air cavity through the front air inlet plate in the front, then continuously sucked upwards into the top negative-pressure air cavity due to the negative pressure in the middle beam air cavity, and finally discharged from the vent cover by the smoke exhaust fan. This is the situation shown at the head end of the wind line 602. Of course, vent holes may be formed on the support straight pipe according to requirements, as shown in FIG. 9.

In the third smoke suction/exhaust function, the bottom fan is finally energized to blow wind outwards. The wind flows from the bottom of the grilling pan. The air flow will enters from the bottom smoke guide groove 504 on the top of the smoke collection cavity. The bottom smoke guide groove 504 is arranged on the top of the smoke collection cavity, and the smoke collection cavity is in communication with the bottom smoke guide groove 504. A negative-pressure smoke suction hole 505 matched with the set position of the bottom smoke guide groove is provided. An eccentric wind guide groove 520 is arranged behind the oil collection guide cavity of the oil collection upper housing. An eccentric smoke guide hole 506 is formed in the eccentric wind guide groove. The eccentric smoke guide hole, the negative-pressure smoke suction hole and the eccentric wind guide groove are communicated with each other. The set position of the negative-pressure smoke suction hole is close to the rotary insertion seat and has a distance of 1 cm to 5 cm from the oil collection groove circle of the grilling pan. In a case where the base fan sucks ambient air, air outside the eccentric smoke guide hole will also be sucked. As shown in FIG. 13, since the eccentric smoke guide hole is formed on the eccentric wind guide groove having an angle of inclination and is oblique but not flat, the eccentric smoke guide hole is far away from a part where direct oil leakage occurs, but can suck smoke. The oil collection upper housing with the negative-pressure smoke suction hole and the grilling pan will form a wind duct with closed upper and lower ends and open periphery so that the air is sucked into the bottom smoke guide groove. However, since the holes 405, through which oil drops are formed in the oil collection groove circle at the center of the grilling pan, air on the surface of the grilling pan will also be sucked downwards to supplement the negative pressure. The downwards-sucked air can speed up the dropping of the oil droplets. The suction of the air on the surface of the grilling pan will take away smoke on the surface of the grilling pan. The oil collection guide cavity is an eccentric circle having a front end with a larger diameter and a larger depth and a rear end with a smaller diameter and a smaller depth to form an oil guide ramp with a slope of at least −3°. An eccentric wind guide groove 520 is further provided around the oil collection guide cavity. The eccentric wind guide groove has a larger area and a smaller depth on a side facing the support connection beam, and a smaller area and a larger depth on a side facing the oil drainage hole. In such a shape, when the support connection beam performs a smoke suction/exhaust operation, the oil collection upper housing is allowed to block smoke at a high position and guide smoke at a low position. Moreover, since the top is just pressed by the grilling pan, an upward wind duct can be formed, as shown by the wind line below the grilling pan in FIG. 5.

When no smoke suction operation is performed, the wind grilling function can be used. The air flow will enter the fan top hole from the vent cover on the top, then enters the fan seat mounting through hole, is sucked and blown into the inner fan cover after entering the fan seat mounting through hole, and arrives the heating coil. The air is heated by the heating coil and then blown to the grilling pan.

A steering lock 512 is provided on an outer side of the support connection beam. The steering lock comprises a lifting inner paddle 513 and a lifting rotary clamp rod 514. A rotary lock plate 515 of the steering lock is connected to the lifting inner paddle. The lifting rotary clamp rod is inserted into the lifting inner paddle, and a lifting cover plate 516 is further provided at the top end of the lifting inner paddle. The rotation locking of the projection heater can be controlled by lifting. Moreover, during the lifting process, the communication of the central beam air cavity with the top negative-pressure air cavity can be controlled.

The smoke exhaust fan 8 and the bottom fan are forward and backward rotatable turbine fans. The heating coil is an infrared carbon fiber electric heating coil. A plurality of rhombic reflector blocks or reflector covers are further fitted onto the inner wall of the outer heat shield. The infrared carbon fiber electric heating coil is stable in heating, long in service life and high safety. The rhombic reflector blocks or reflector covers enhances the downward concentrated reflection of infrared rays and relieves the heat radiation to the whole projection heater. An oil absorption screen or an oil absorption tile 517 is arranged on the bottom of the inner fan cover by the top connecting nut, and a spacer 126 is provided between the inner fan cover and the outer heat shield. The oil absorption screen or oil absorption tile filters vapor oil droplets and water vapor when it sucks air upwards. The spacer mainly functions to separate the set space, so that heat does not be transferred up and down quickly.

It should be understood that, in the claims and the specification of the present invention, the term "comprising . . . " should be interpreted as the open meaning, i.e., being equivalent to "at least containing . . . ", but should not be interpreted as the closed meaning, i.e., "only containing . . . ". The specific embodiments described herein are merely for illustrating the spirit of the present invention. Those skilled in the art can make various modifications or supplements to the described specific embodiments or replace them in a similar manner, without departing from the spirit of the present invention or the scope defined by the appended claims.

What is claimed is:

1. A grill of top projecting and radiating type, comprising a projection heater, a support connection beam, a base and a grilling pan arranged on the base, the projection heater being located above the grilling pan, the projection heater being fixed on the base via the support connection beam, wherein the base comprises a substrate housing; an upper end face of the substrate housing is provided with an oil collection upper housing; a grilling pan rotating motor is arranged in the substrate housing; the center of an upper surface of the grilling pan is low and the periphery thereof is high; a rotary socket pipe is fixedly arranged at the bottom center of the grilling pan; an electric motor shaft of the grilling pan rotating motor passes through the oil collection upper housing from bottom to top, is inserted into the rotary socket pipe and is then connected to the grilling pan so as to realize the synchronized rotation of the motor shaft and the grilling pan; the grilling pan rotating motor drives the grilling pan to rotate; a plurality of holes, through which oil drops, are arranged at intervals, around the rotary socket pipe, on the grilling pan; an upper end face of the oil collection upper housing is recessed downwards to form an oil collection guide cavity; the bottom of the oil collection guide cavity is provided with an oil drainage hole; the holes, through which oil drops, are located directly above the oil collection guide cavity; a front oil box is also arranged in the substrate housing; and, the front oil box is in communication with the oil drainage hole.

2. The grill of top projecting and radiating type according to claim 1, wherein the projection heater comprises a projector housing, a connecting screen outer cover, a heating coil, a heat shield set and a smoke exhaust fan; the projector housing is of a dome structure having a concave or arc-shaped section; the heat shield set comprises a housing connecting base, an outer heat shield and an inner fan cover which are successively arranged in a dome cavity inside the projector housing from top to bottom; the top of the projector housing is a vent cover; a plurality of vent holes are formed on the vent cover; an upper end of the housing connecting base is fixedly connected to the vent cover via a first fastener, while a lower end face thereof is fixedly connected to the outer heat shield via a second fastener, and the lower end face and the outer heat shield are fixedly connected together by a top connecting nut set of the inner fan cover; the housing connecting base is provided with a fan seat mounting through hole; the outer heat shield is provided with a fan opening A; an upper end face of the inner fan cover is recessed downwards to form a groove; the fan seat mounting through hole and the fan opening A are communicated up and down opposite to each other and form a mounting cavity with the groove; a fan seat is arranged in the mounting cavity, and the smoke exhaust fan is arranged on the fan seat; a plurality of wind holes distributed in a vortex shape are formed on the bottom of the groove; the connecting screen outer cover is arranged below the inner fan cover and is fixedly connected to the inner fan cover via a top connecting nut set; the heating coil is located between the connecting screen outer cover and the inner fan cover; the connecting screen outer cover comprises a cover body, a connecting disk and support concave frames; the cover body is hollow and the connecting disk is fixed at the center of the cover body; the plurality of support concave frames are fixedly arranged on a side face of the cover body facing the heating coil; frame grooves are provided on the support concave frames; the heating coil is clamped in the frame grooves on at least two support concave frames; the connecting disk is fixedly connected with the inner fan cover via the top connecting nut set; an oil receiving plate is further provided in the mounting cavity; the oil receiving plate is located between the fan seat and the inner fan seat and is disk-shaped; gaps are reserved among the upper and lower end faces of the oil receiving plate, the fan seat and the groove; the gaps form an upper smoke overflow passage and a lower smoke overflow passage that are communicated with each other, respectively; the projection heater further comprises a vent cover seat that is matched with the top of the projector housing in shape; the vent cover seat covers the top of the projector housing; a fan top hole is formed at the top center of the vent cover seat; the vent cover is located in the fan top hole; and, the vent cover seat covers the outer surface of the projector housing.

3. The grill of top projecting and radiating type according to claim 1, wherein the support connection beam comprises a support beam frame housing; upper and lower ends of the support beam frame housing are connected to the projection heater and the base, respectively; a smoke collection cavity and an inner operating cavity communicated with each other are provided in the substrate housing; the smoke exhaust fan is arranged in the inner operating cavity; a support inner beam pipe is penetrated through the support beam frame housing; two ends of the support inner beam pipe are in communication with the smoke collection cavity and the dome cavity of the projector housing, respectively; the inner operating cavity is in communication with the oil collection guide cavity; a middle beam air cavity is provided between the support inner beam pipe and the support beam frame housing; a plurality of air inlets communicated with the middle beam air cavity are formed on a sidewall of the support beam frame housing facing the grilling pan; an upper end of the middle beam air cavity is in communication with the dome cavity of the projector housing; a rotary handle is arranged on an outer side of the support connection beam; a lifting rotary clamp rod is provided in the middle beam air cavity; the rotary handle is rotatably connected to the support beam frame housing via a rotating shaft; a poke rod parallel to the rotating shaft is further provided on an inner side of the rotary handle; the lifting rotary clamp rod is arranged vertically and provided with a poking clamp groove; one end of the poke rod is fixedly connected to the rotary handle, while the other end thereof extends into the central beam air cavity 206 and is inserted into the poking clamp groove; during its rotation, the rotary handle can drive the lifting rotary clamp rod to lift up and down via the poke rod; the support connection beam is divided into a vertical section and a connection section; a lower end of the vertical section is fixedly connected to the base, while an upper end thereof is connected to the projection heater via the connection section; the support inner beam pipe successively passes through the vertical section and the connection section; an upper end of the support inner beam pipe is fixedly connected to the connection section, while a lower end thereof can freely rotate relative to the vertical section; connecting plates are provided at connection ends of the vertical section and the connection section, and the two connecting plates are fitted with each other in an up-down direction; a lower locking pin hole is formed on the lower connecting plate, and a plurality of upper locking pin holes are formed on the upper connecting plate; the upper end of the lifting rotary clamp rod always directly faces the lower locking pin hole in an up-down direction; when the connection section and the upper inner beam pipe are rotated relative to the support beam frame housing, the plurality of upper locking pin holes on the upper connecting plate can successively directly face the lower locking pin holes in the up-down direction; through holes communicated up and down are formed on the two connecting plates; a lifting cover plate fixedly connected to the lifting rotary clamp rod is provided in the vertical section; and, the lifting cover plate can occlude the through hole on the lower connecting plate when it is lifted up along with the lifting rotary clamp rod.

4. The grill of top projecting and radiating type according to claim 1, wherein a support insertion seat is provided on a side edge of the base; the support connection beam is arranged vertically upwards in the support insertion seat; the support connection beam supports and is connected to the projection heater; the projection heater is arranged transversely; the projection heater, the support connection beam and the base form a ⊏-shaped structure; the grilling pan is arranged on the base directly below the projection heater; the projection heater comprises a projection heating portion and an insertion connection portion; the insertion connection portion is integrally extended out from the rear of the projection heating portion; the insertion connection portion is spliced with the top of the support connection beam; the projection heating portion comprises a projector housing, a connecting screen outer cover, a heating coil, a heat shield set and a top connection module; the projector housing is of a dome structure having a concave or arc-shaped section; the top connection module, the heat shield set and the heating coil are arranged in a dome cavity inside the projector housing from top to down, and the bottom of the dome cavity of the projector housing is finally covered by the connecting screen outer cover from bottom to top in a buckling manner; the connecting screen outer cover comprises a cover body, a connecting disk, a top connecting nut set and support concave frames; the top of the cover body faces upwards, and four support concave frames are symmetrically arranged at upper, lower, left and right positions on the cover body; the connecting disk is welded at the center of the cover body, and a nut hole A is formed at the center of the connecting disk; the top connecting nut set is arranged above the nut hole A; the top connecting nut set comprises an mountain-shaped stud and a limiting pipe; a screw post is arranged at the head of the mountain-shaped stud, and a lower end of the mountain-shaped stud is a screw tube; a screw on the bottom of the connecting disk is screwed into the screw tube of the mountain-shaped stud through the nut hole A, and the connecting disk is connected to the top connecting nut set; the top connecting nut set is screwed upwards into a center suspension screw hole seat of the inner fan cover; during the screwing process, the heating coil is erected in frame grooves of the support concave frames, the heating coil is buckled and fixed by the frame grooves, and the heating coil is clamped between the connecting screen outer cover and the inner fan cover along with the connection of the connecting screen outer cover and the inner fan cover; the heat shield set comprises the inner fan cover, a fan seat and an outer heat shield; a fan opening A is formed at the center of the outer heat shield; a downward-recessed turbine wind hole is formed at the center of the inner fan cover; a connecting stud is arranged around the turbine wind hole; a screw is inserted into a screw through hole on the fan seat after passing through a through hole on the connecting stud, so as to fix the fan seat on the top of the inner fan cover, and the fan seat is protruded from a fan seat mounting through hole after passing through the fan opening A under the cover of the outer heat cover and is close to a vent cover; a smoke exhaust fan is arranged in the fan seat; the outer heat shield is arranged around the fan opening A; a stud on the top of the inner fan cover is connected to the center suspension screw hole seat suspended on the outer heat shield; the grilling pan comprises a pan body and a rotary socket pipe arranged at the bottom center of the pan body; the pan body and the rotary socket pipe are integrally molded of a metal material; the rotary socket pipe is inserted into a rotary base via an oil-proof insertion seat, supported by the oil-proof insertion seat and sleeved with a rotary driving shaft in the rotary base, and is driven to rotate by a grilling pan rotating motor under the linkage of the rotary driving shaft; an oil distribution convex cover is hermetically provided on the top of the rotary insertion pipe; an oil collection groove circle is arranged around the oil distribution convex cover, and a plurality of holes, through which oil drops, are formed in the oil collection groove circle; a vent plate is provided at an opening on the bottom of the insertion connection portion; a wind inlet hole or a wind inlet groove is formed on the vent plate; and, the vent plate and the main body of the insertion connection portion form a top negative-pressure air cavity.

5. The grill of top projecting and radiating type according to claim 1, wherein the base comprises the oil collection upper housing, the substrate housing, an inner operating cavity, the front oil box, a smoke collection cavity and a support insertion seat; the front end of the oil collection upper housing is recessed downwards to form an oil cavity placement seat; a rotary base and an oil guide lower bucket are arranged in the oil cavity placement seat; the oil collection upper housing is fitted onto the substrate housing; the substrate housing is recessed downwards to form an oil collection guide cavity; a protruded oil-proof insertion seat is arranged at the center of the oil collection and guide cavity; a grilling pan insertion pipe upper hole is formed at the center of the oil-proof insertion seat; the set position of the oil-proof insertion seat is matched with the rotary base, and the oil-proof insertion seat and the rotary base are spliced or covered with each other; the set shape and position of the gripping pan insertion pipe upper hole are matched with the rotary base; the front end of the oil-proof insertion seat is provided with an oil drainage hole that is matched with the position and shape of the oil guide lower bucket; the front oil box is suspended at the lower end of the substrate housing at the set position of the oil guide lower bucket; the inner operating cavity is integrally molded and arranged at the rear end of the front oil box; the grilling pan rotating motor is arranged below the position of the inner operating cavity matched with the support insertion seat; a shaft of the grilling pan rotating motor is inserted into the support insertion seat, and is connected and clamped with a rotary driving shaft arranged in the support insertion set to drive the rotary driving shaft to rotate; the smoke collection cavity is integrally molded with the substrate housing, and is arranged at the lower end of the substrate housing matched with the set position of the support insertion seat; in the rear of the inner operating cavity, a driving wind duct is provided at the head of the smoke collection cavity to communicate with a base fan; the tail end of the smoke collection cavity is in communication with the support insertion seat, and the tail end of the support inner beam pipe is extended into the tail end of the smoke collection cavity; and, an oil cavity air suction platform is convexly arranged at a position on the top of the base fan matched with the oil cavity placement seat, and at least one air suction hole is formed on the oil cavity air suction platform.

6. The grill of top projecting and radiating type according to claim 1, wherein the support connection beam comprises a support beam frame housing, a front air inlet plate and a support inner beam pipe; the support beam frame housing is arc-shaped, semi-circular or U-shaped, and an air inlet is formed at the front end of the support beam frame housing; the front air inlet plate is buckled or inserted into the air inlet; the front air inlet plate and the support beam frame housing form a middle beam air cavity; the front air inlet plate is hollowed out to from a plurality of smoke inlet holes; the support inner beam pipe is vertically inserted into the support beam frame housing; support plates are provided on both the top and bottom of the support beam frame housing, and the support plates are inserted into the support inner beam pipe; the support inner beam pipe comprises a support straight pipe and a bent beam conduit between which a connecting rotating shaft sleeve is provided; the support inner beam pipe supports the projection heater transversely arranged on the top of the support connection beam, and the support inner beam pipe and the projection heater are separate from each other; and, the projection heater relies upon the connecting rotating shaft sleeve to rotate about the support straight pipe.

7. The grill of top projecting and radiating type according to claim 6, wherein a steering lock is provided on an outer side of the support connection beam; the steering lock comprises a lifting inner paddle and a lifting rotary clamp rod; a rotary lock plate of the steering lock is connected to the lifting inner paddle; the lifting rotary clamp rod is inserted into the lifting inner paddle, and a lifting cover plate is further provided at the top end of the lifting inner paddle; a bottom airtight plate is provided between the bottom of the support connection beam and the support insertion seat; and, a through hole for allowing the support straight pipe to be inserted therein is formed on the bottom airtight plate.

8. The grill of top projecting and radiating type according to claim 5, wherein a bottom smoke guide groove is formed on the top of the smoke collection cavity, the smoke collection cavity and the bottom smoke guide groove are communicated with each other, and a negative-pressure smoke suction hole matched with the set position of the bottom smoke guide groove is provided; an eccentric wind guide groove is arranged behind the oil collection guide cavity of the oil collection upper housing; an eccentric smoke guide hole is formed in the eccentric wind guide groove; the eccentric smoke guide hole, the negative-pressure smoke suction hole and the eccentric wind guide groove are communicated with each other; the set position of the negative-pressure smoke suction hole is close to the rotary insertion seat, and has a distance of 1 cm to 5 cm from the oil collection groove circle of the grilling pan; the oil collection guide cavity is an eccentric circle having a front end with a larger diameter and a larger depth and a rear end with a smaller diameter and a smaller depth to form an oil guide ramp with a slope of at least $-3°$; an eccentric wind guide groove is further provided around the oil collection and guide cavity; the eccentric wind guide groove has a larger area and a smaller depth on a side facing the support connection beam, and a smaller area and a larger depth on a side facing the oil drainage hole; a protruded oil-proof insertion seat is arranged on the bottom of the oil collection guide cavity; a lower end of the rotary socket seat is suited on the oil-proof insertion seat; an electric motor shaft of the grilling pan rotating motor passes through the oil-proof insertion seat and is then inserted into the rotary socket seat; and, the oil-proof insertion seat is higher than other positions of the oil collection guide cavity.

9. The grill of top projecting and radiating type according to claim 2, wherein a plurality of support concave frames of the connecting screw outer cover are arranged annularly at intervals; the frame grooves on the plurality of support concave frames can be located on a same circumference which is sized to match the size of the heating coil; or, the frame grooves on the plurality of support concave frames are located on two or more circumferences, each of which is correspondingly clamped with one heating coil; and, when there are a plurality of heating coils, the heating coils can be arranged in the form of such concentric circles, and the heating coils are infrared carbon fiber electric heating coils.

10. The grill of top projecting and radiating type according to claim 4, wherein the pan body of the grilling pan has a circular front cross section, a surface coated with an anti-smoke and anti-sticking coating and a conical vertical anatomical face; the conical shape has a small-diameter bottom and a large-diameter top to from a trumpet mouth shape; a plurality of oil guide slots are dispersedly arranged on the surface of the pan body by using the oil distribution convex cover as an axis; and, the oil guide slots comprise convex slot lines and concave slot lines, and the convex slot lines and the concave slot lines are arranged alternately.

11. The grill of top projecting and radiating type according to claim 1, wherein a support insertion seat is provided on a side edge of the base; the support connection beam is arranged vertically upwards in the support insertion seat; the support connection beam supports and is connected to the projection heater; the projection heater is arranged transversely; the projection heater, the support connection beam and the base form a ⊏-shaped structure; the grilling pan is arranged on the base directly below the projection heater; the projection heater comprises a projection heating portion and an insertion connection portion; the insertion connection portion is integrally extended out from the rear of the projection heating portion; the insertion connection portion is spliced with the top of the support connection beam; the projection heating portion comprises a projector housing, a connecting screen outer cover, a heating coil, a heat shield set and a top connection module; the projector housing is of a dome structure having a concave or arc-shaped section; the top connection module, the heat shield set and the heating coil are arranged in a dome cavity inside the projector housing from top to down, and the bottom of the dome cavity of the projector housing is finally covered by the connecting screen outer cover from bottom to top in a buckling manner; the connecting screen outer cover comprises a cover body, a connecting disk, a top connecting nut set and support concave frames; the top of the cover body faces upwards, and four support concave frames are symmetrically arranged at upper, lower, left and right positions on the cover body; the connecting disk is welded at the center of the cover body, and a nut hole A is formed at the center of the connecting disk; the top connecting nut set is arranged above the nut hole A; the top connecting nut set comprises an mountain-shaped stud and a limiting pipe; a screw post is arranged at the head of the mountain-shaped stud, and a lower end of the mountain-shaped stud is a screw tube; a screw on the bottom of the connecting disk is screwed into the screw tube of the mountain-shaped stud through the nut hole A, and the connecting disk is connected to the top connecting nut set; the top connecting nut set is screwed upwards into a center suspension screw hole seat of the inner fan cover; during the screwing process, the heating coil is erected in frame grooves of the support concave frames, the heating coil is buckled and fixed by the frame grooves, and the heating coil is clamped between the connecting screen outer cover and the inner fan cover along with the connection of the connecting screen outer cover and the inner fan cover; the heat shield set comprises the inner fan cover, a fan seat and an outer heat shield; a fan opening A is formed at the center of the outer heat shield; a downward-recessed turbine wind hole is formed at the center of the inner fan cover; a connecting stud is arranged around the turbine wind hole; a screw is inserted into a screw through hole on the fan seat after passing through a through hole on the connecting stud, so as to fix the fan seat on the top of the inner fan cover, and the fan seat is protruded from a fan seat mounting through hole after passing through the fan opening A under the cover of the outer heat cover and is close to a vent cover; a smoke exhaust fan is arranged in the fan seat; the outer heat shield is arranged around the fan opening A; a stud on the top of the inner fan cover is connected to the center suspension screw hole seat suspended on the outer heat shield; the grilling pan comprises a pan body and a rotary socket pipe arranged at the bottom center of the pan body; the pan body and the rotary socket pipe are integrally molded of a metal material; the rotary socket pipe is inserted into a rotary base through an oil-proof insertion seat, supported by the oil-proof insertion seat and sleeved with a rotary driving shaft in the rotary base, and is driven to rotate by the grilling pan rotating motor under the linkage of the rotary driving shaft; an oil distribution convex cover is hermetically provided on the top of the rotary insertion pipe; an oil collection groove circle is arranged around the oil distribution convex cover, and a plurality of holes, through which oil drops, are formed in the oil collection groove circle; a vent plate is provided at an opening on the bottom of the insertion connection portion; a wind inlet hole or a wind inlet groove is formed on the vent plate; and, the vent plate and the main body of the insertion connection portion form a top negative-pressure air cavity.

12. The grill of top projecting and radiating type according to claim 1, wherein the base comprises the oil collection upper housing, the substrate housing, an inner operating cavity, the front oil box, a smoke collection cavity and a support insertion seat; the front end of the oil collection upper housing is recessed downwards to form an oil cavity placement seat; a rotary base and an oil guide lower bucket are arranged in the oil cavity placement seat; the oil collection upper housing is fitted onto the substrate housing; the substrate housing is recessed downwards to form an oil collection guide cavity; a protruded oil-proof insertion seat is arranged at the center of the oil collection and guide cavity; a grilling pan insertion pipe upper hole is formed at the center of the oil-proof insertion seat; the set position of the oil-proof insertion seat is matched with the rotary base, and the oil-proof insertion seat and the rotary base are spliced or covered with each other; the set shape and position of the gripping pan insertion pipe upper hole are matched with the rotary base; the front end of the oil-proof insertion seat is provided with an oil drainage hole that is matched with the position and shape of the oil guide lower bucket; the front oil box is suspended at the lower end of the substrate housing at the set position of the oil guide lower bucket; the inner operating cavity is integrally molded and arranged at the rear end of the front oil box; the grilling pan rotating motor is arranged below the position of the inner operating cavity matched with the support insertion seat; a shaft of the grilling pan rotating motor is inserted into the support insertion seat, and is connected and clamped with a rotary driving shaft arranged in the support insertion set to drive the rotary driving shaft to rotate; the smoke collection cavity is integrally molded with the substrate housing, and is arranged at the lower end of the substrate housing matched with the set position of the support insertion seat; in the rear of the inner operating cavity, a driving wind duct is provided at the head of the smoke collection cavity to communicate with a base fan; the tail end of the smoke collection cavity is in communication with the support insertion seat, and the tail end of the support inner beam pipe is extended into the tail end of the smoke collection cavity; and, an oil cavity air suction platform is convexly arranged at a position on the top of the base fan matched with the oil cavity placement seat, and at least one air suction hole is formed on the oil cavity air suction platform.

13. The grill of top projecting and radiating type according to claim 1, wherein the support connection beam comprises a support beam frame housing, a front air inlet plate and a support inner beam pipe; the support beam frame housing is arc-shaped, semi-circular or U-shaped, and an air inlet is formed at the front end of the support beam frame housing; the front air inlet plate is buckled or inserted into the air inlet; the front air inlet plate and the support beam frame housing form a middle beam air cavity; the front air inlet plate is hollowed out to from a plurality of smoke inlet holes; the support inner beam pipe is vertically inserted into the support beam frame housing; support plates are provided on both the top and bottom of the support beam frame housing, and the support plates are inserted into the support inner beam pipe; the support inner beam pipe comprises a support straight pipe and a bent beam conduit between which a connecting rotating shaft sleeve is provided; the support inner beam pipe supports the projection heater transversely arranged on the top of the support connection beam, and the support inner beam pipe and the projection heater are separate from each other; and, the projection heater relies upon the connecting rotating shaft sleeve to rotate about the support straight pipe.

14. The grill of top projecting and radiating type according to claim 3, wherein a plurality of support concave frames of the connecting screw outer cover are arranged annularly at intervals; the frame grooves on the plurality of support concave frames can be located on a same circumference which is sized to match the size of the heating coil; or, the frame grooves on the plurality of support concave frames are located on two or more circumferences, each of which is correspondingly clamped with one heating coil; and, when there are a plurality of heating coils, the heating coils can be arranged in the form of such concentric circles, and the heating coils are infrared carbon fiber electric heating coils.

\* \* \* \* \*